(12) United States Patent
Choi

(10) Patent No.: US 8,687,602 B2
(45) Date of Patent: Apr. 1, 2014

(54) METHODS AND APPARATUS FOR ERROR CORRECTION FOR COORDINATED WIRELESS BASE STATIONS

(75) Inventor: Hyung-Nam Choi, Hamburg (DE)

(73) Assignee: Apple Inc., Cupertino, CA (US)

( * ) Notice: Subject to any disclaimer, the term of this patent is extended or adjusted under 35 U.S.C. 154(b) by 1219 days.

(21) Appl. No.: 12/569,586

(22) Filed: Sep. 29, 2009

(65) Prior Publication Data

US 2011/0075611 A1    Mar. 31, 2011

(51) Int. Cl.
*H04B 7/216* (2006.01)

(52) U.S. Cl.
USPC ............ 370/335; 370/230; 370/235; 370/331

(58) Field of Classification Search
None
See application file for complete search history.

(56) References Cited

U.S. PATENT DOCUMENTS

| | | | | |
|---|---|---|---|---|
| 8,150,412 | B2 * | 4/2012 | Cheng et al. .................. | 455/453 |
| 2008/0043703 | A1 * | 2/2008 | Choi et al. ..................... | 370/342 |
| 2009/0196245 | A1 * | 8/2009 | Ji ..................................... | 370/329 |
| 2009/0323577 | A1 * | 12/2009 | Agrawal et al. ............... | 370/312 |
| 2010/0296431 | A1 * | 11/2010 | Terry et al. ..................... | 370/315 |

OTHER PUBLICATIONS

3GPP TSG RAN #39 (Mar. 4-7, 2008): RP-080137 entitled "*Further advancements for E-UTRA (LTE-Advanced)*" to NTT DoCoMo, et al.

3GPP TS 36.913 V8.0.1 (Mar. 2009): 3rd Generation Partnership Project; Technical Specification Group Radio Access Network; "*Requirements for further advancements for Evolved Universal Terrestrial Radio Access (E-UTRA) (LTE-Advanced),*" (Release 8), pp. 1-15.

3GPP TS 36.814 V0.4.1 (Feb. 2009): $3^{rd}$ Generation Partnership Project; Technical Specification Group Radio Access Network; "*Further advancements for E-UTRA—Physical Layer Aspects,*" (Release 9), pp. 1-31.

3GPP TS 36.211 V8.7.0 (May 2009): 3rd Generation Partnership Project; Technical Specification Group Radio Access Network; Evolved Universal Terrestrial Radio Access (E-UTRA); "*Physical Channels and Modulation,*" (Release 8), pp. 9-11.

* cited by examiner

*Primary Examiner* — Ian N Moore
*Assistant Examiner* — Brian T Le
(74) *Attorney, Agent, or Firm* — Fay Kaplun & Marcin, LLP

(57) ABSTRACT

Methods and apparatus for coordinated error correction among a set of wireless base stations in communication with one another. In one embodiment, the wireless base stations are part of a cellular network having various cellular base stations (including a serving base station, and multiple supplemental base stations), and transmit multiple redundant versions of a transport block using a Hybrid Automatic Repeat Request (HARQ) based scheme. The aggregate of the multiple redundant versions of the transport block are soft combined and acknowledged (ACK) or not-acknowledged (NACK) by the cellular equipment. The serving base station and supplemental base station devices dynamically configure the bundled acknowledgment operation based on various desired operational attributes relating to the operational parameters of the network.

12 Claims, 13 Drawing Sheets

METHODS AND APPARATUS FOR ERROR CORRECTION FOR COORDINATED WIRELESS BASE STATIONS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to enhanced methods and apparatus for coordinating cellular base stations using backward error correction.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in the future, namely to speeds on the order of 300 Mbps in the downlink transmission direction and 75 Mbps in the uplink transmission direction.

In parallel, further advancements of 3GPP are being investigated within LTE towards an IMT-Advanced radio interface technology, referred to as "LTE-Advanced" or "LTE-A". Details regarding scope and objectives of the LTE-Advanced study are described at, inter alia; RP-080137 entitled "*Further advancements for E-UTRA (LTE-Advanced)*" to NTT DoCoMo et al., the contents of which are incorporated herein by reference in its entirety. The IMT-Advanced activities have been commenced and are guided by ITU-R (International Telecommunications Union-Radio Communication Sector). Key features to be supported by candidate IMT-Advanced systems have been set by ITU-R and include amongst others: (1) high quality mobile services; (2) worldwide roaming capability; and (3) peak data rates of one hundred (100) Mbps for high mobility environments, and of one (1) Gbps for low mobility environments.

The current discussions in 3GPP related to LTE-A are focused on the technologies to further evolve LTE in terms of spectral efficiency, cell edge throughput, coverage and latency based on the requirements in 3GPP TS 36.913: "*Requirements for further advancements for E-UTRA (LTE-Advanced)*", which is incorporated herein by reference in its entirety. Candidate technologies include (1) multi-hop Relay; (2) downlink network Multiple Input Multiple Output (MIMO) antenna technologies; (3) support for bandwidths greater than twenty MHz by spectrum aggregation; (4) flexible spectrum usage/spectrum sharing; and (5) Coordinated Multipoint Transmission/Reception (CoMP). These proposed technologies are based on the requirements of 3GPP TS 36.814: "*Further advancements for E-UTRA—Physical Layer Aspects*", which is incorporated herein by reference in its entirety. Backward compatibility with legacy LTE networks is also an important requirement for future LTE-A networks, i.e. an LTE-A network also supports LTE user equipment (UE), and an LTE-A UE can operate in an LTE network.

Coordinated Multipoint Transmission/Reception (CoMP) Operation

The aforementioned Coordinated Multipoint Transmission/Reception (CoMP) is one proposed approach for improving high data rate coverage, cell-edge throughput and or system throughput. FIG. 1 illustrates one exemplary CoMP deployment scenario 100 of an LTE-Advanced network comprising seven (7) cells, each cell is served by an associated base station 104. As shown in FIG. 1, a UE 102 receives data coverage from three (3) cells (Cell 1 104A, Cell 2 104B, and Cell 3 104C) which have been "coordinated" to minimize interference with one another. During operation, each one of the coordinated base stations manages control and user data transmissions with the UE according to a specific coordinated schedule. Thus, the UE receives control and user data from only one of the transmitting cells at any time.

During CoMP operation, the UE 102 maintains a distinct dialog with each of its coordinated base stations (i.e., both serving 104A, and supplemental base stations 104B, 104C) for control and data signaling. For example, error correction (such as Hybrid Automatic Repeat Request (HARQ)) is independently managed between each BS and the UE. The independent nature of prior art signaling increases appreciably in proportion to the number of concurrent connections. Thus, in the exemplary scenario of FIG. 1, the UE and Radio Access Network must maintain three (3) independent HARQ software processes, and their associated network resources (e.g., subframes, bandwidth, etc.).

Consequently, improved methods and apparatus are needed to optimize the overhead associated with multipoint topologies in wireless (e.g., cellular) networks. Ideally, such improved methods and apparatus should minimize the interference between each of the BSs, and improve overall error correction capabilities of the coordinated cells. Moreover, wireless networks that implement these methods and apparatus may substantially improve resource utilization, inter alia, by reducing transmit power, and error correction latency.

SUMMARY OF THE INVENTION

The present invention satisfies the foregoing needs by providing, inter alia, methods and apparatus for error correction in a system having two or more coordinated base stations.

In a first aspect of the invention, a method of operating a first wireless transmitter is disclosed. In one embodiment, the method includes: receiving a data stream from a second wireless transmitter; receiving one or more transmission parameters from the second wireless transmitter; and transmitting a partial backward error correction data packet for the data stream, the partial backward error correction data packet being based at least in part on the one or more transmission parameters received from the second wireless transmitter. The data stream has not been previously encoded and transmitted from the first wireless transmitter.

In one variant, the data stream has been encoded at the second wireless transmitter, the encoded data stream having been previously transmitted by the second wireless transmitter.

In another variant, the one or more transmission parameters include a transmission schedule.

In yet another variant, the first wireless transmitter is associated with a first identifier. The one or more transmission parameters may include one or more identifiers, at least one of the one or more identifiers matching the first identifier.

In a further variant, the one or more transmission parameters includes a transmit power.

In another variant, the method further comprises encoding the data stream into the partial backward error correction data packet using a convolutional encoder.

In still other variants, the partial backward error correction data packet is self-decodable or alternatively not self-decodable.

In a further variant, the method further comprises receiving an acknowledgement message from the second wireless transmitter.

In a second aspect of the invention, a method of optimizing inter-cell operation within a multi-cell wireless network is disclosed. In one embodiment, the method includes: transmitting a first one or more data packets from a first cell; and selectively scheduling at least one other cell for the transmission of subsequent error correction packets, the subsequent error correction packets comprising redundant information useful for the correction of the first one or more data packets. The transmitting and selectively scheduling cooperate to substantially reduce a transmission power required for the first cell of the network.

In one variant, the method further comprises: responsive to receiving the first one or more data packets and the subsequent error correction packets at a first receiver: decoding the first one or more data packets and subsequent error correction packets in combination; and transmitting a message to the first cell, where the message indicates success or failure of the decoding.

In another variant, the method further comprises (if the message indicates success of the decoding): transmitting a second one or more data packets from the first cell; and selectively scheduling at least one other cell for the transmission of subsequent error correction packets, the subsequent error correction packets comprising redundant information useful for the correction of the second one or more data packets. If the message indicates failure of the decoding, the method includes transmitting a second set of error correction packets from the first cell and at least one other cell, the second set of error correction packets comprising redundant information useful for the correction of the first one or more data packets.

In yet another variant, the method further comprises determining the reduction in transmission power of the first cell of the network based at least in part on the subsequent error correction packets of the at least one other cell.

In a third aspect of the invention, receiver apparatus is disclosed. In one embodiment, the apparatus includes: a digital processor; a wireless interface in data communication with the digital processor; and a storage apparatus having a storage medium with at least one computer program stored thereon, the at least one computer program comprising a plurality of computer executable instructions. When executed by the digital processor, the instructions: receive at least partly corrupted data from a first transmitter over the wireless interface; receive error correction data from at least one second transmitter over the wireless interface; decode the received data in conjunction with the error correction data and transmit an acknowledgement message.

In one variant, the acknowledgment message is directed to the first transmitter.

In another variant the acknowledgment message is directed to the second transmitter.

In yet another variant, the at least partly corrupted data is identified with a first identifier, the first identifier associated with a data block. The error correction data may also be identified with the first identifier.

In a further variant, the instructions "soft combine" the at least partly corrupted data and error correction data, and the acknowledgment message indicates either a successful decoding or an unsuccessful decoding.

In a fourth aspect of the invention, receiver apparatus is disclosed. In one embodiment, the base station apparatus includes: a digital processor; a wireless interface in data communication with the processor; a network interface in data communication with the processor, the network interface coupled to at least one other base station apparatus; and a storage apparatus having a storage medium with at least one computer program stored thereon. The computer program when executed: generates a first data packet from a transport block; transmits the transport block via the network interface to the at least one other base station apparatus the transmitted transport block being configured to cause the at least one other base station apparatus to generate a second data packet from the transport block; and transmits the first data packet via the wireless interface, the first data packet substantially differing from the second data packet.

In one variant, the apparatus further includes instructions that when executed by the digital processor: receive a message delivered via the wireless interface, the message indicating successful or unsuccessful decoding of the first data packet and second data packet; and if the message indicates unsuccessful decoding: generate a third data packet from the transport block; notify the at least one other base station of the unsuccessful decoding, the notification being adapted to cause the at least one other base station apparatus to generate a fourth data packet from the transport block; and transmit the third data packet via the wireless interface, the third data packet substantially differing from the fourth data packet.

In another variant, the apparatus further comprise instructions that when executed by the digital processor: generate a transmission schedule; and transmit the transmission schedule via the network interface to the at least one other base station apparatus. The at least one other base station apparatus may be associated with a first identifier, and the transmission schedule indicates a transmission time for the at least one other base station apparatus associated with the first identifier.

Alternatively, the transmission schedule can indicate a transmission power for the at least one other base station apparatus associated with the first identifier.

In a fifth aspect of the invention, a computer readable apparatus is disclosed. In one embodiment, the apparatus comprises a storage medium having a computer program disposed thereon, the computer program being adapted to perform error correction in a system having two or more coordinated base stations.

In a sixth aspect of the invention, a wireless system is disclosed. In one embodiment, the system includes a cellular LTE-compliant system having a plurality of coordinated base stations and a plurality of mobile devices.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
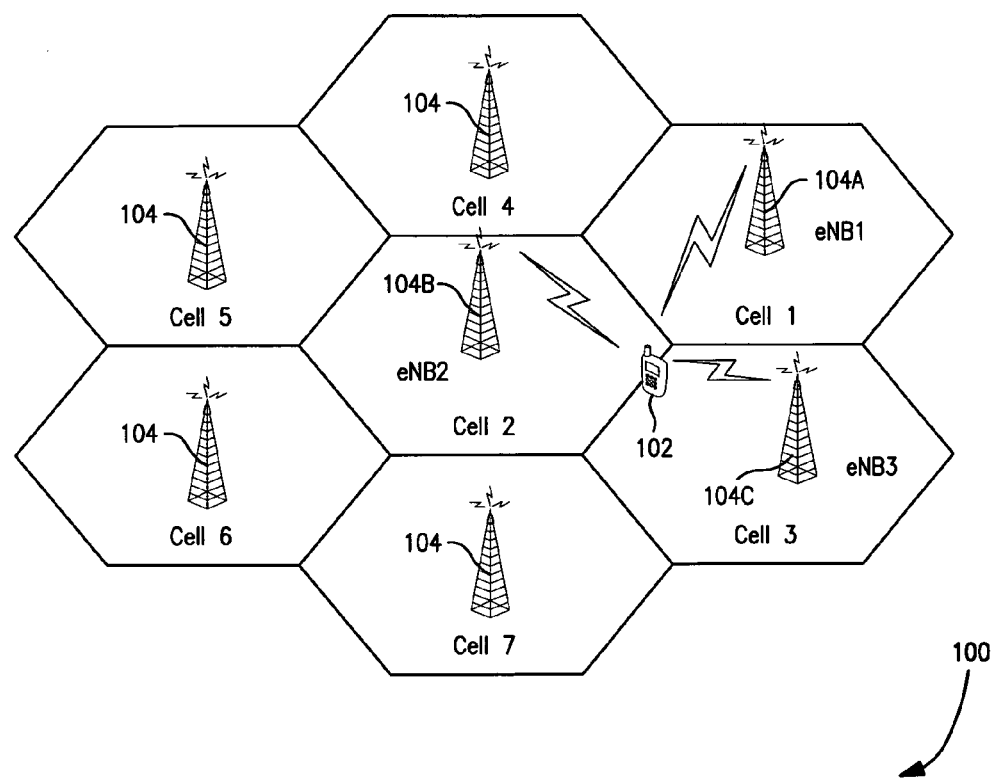
FIG. 1 is a graphical illustration of one prior art embodiment of a Coordinated Multipoint Transmission/Reception (CoMP) Long Term Evolution Advanced (LTE-A) network.

Reference is now made to the drawings, wherein like numerals refer to like parts throughout.

Overview

The present invention provides, inter alia, methods and apparatus for coordinated error correction among a set of wireless (e.g., cellular) base stations communicating with user equipment. In one exemplary embodiment, LTE and LTE-Advanced Networks channels and transmission techniques (e.g., Hybrid Automatic Repeat Request (HARQ)) are modified to improve cellular service near cell boundaries. A set of cellular base stations (including a serving base station, and multiple supplemental base stations) transmit multiple redundant versions of the same data using a Hybrid Automatic Repeat Request (HARQ) based scheme. The multiple versions of the same data are "soft-combined" and acknowledged (ACK) or not-acknowledged (NACK) by the user equipment.

Various methods and apparatus for coordinating the base stations are disclosed. In one implementation, the serving base station configures and manages a plurality of supplemental base stations. The serving base station and supplemental base station devices may be configured to dynamically configure the bundled acknowledgment operation, based on various desired operational attributes which are internally communicated. Such operational attributes relate to, for example, order of transmission, redundancy version of transmission, transmit power, etc. The serving base station may also be configured to consider the radio environment of the mobile device, including such measurable parameters as nearby cell IDs, corresponding signal noise ratios for each of the nearby cell IDs, etc.

The foregoing methods and apparatus advantageously reduce the transmit power of each base station, thereby reducing the effects of base station induced interference among neighboring base stations, yet without substantially increasing the likelihood of data corruption. In some embodiments, the lower transmit power is compensated for using other mechanisms, so as to retain equivalent (if not better) reception characteristics.

Moreover, the methods and apparatus of the invention contract or reduce the time necessary for various error correction schemes. Such expedited error correction contributes to improved system latency and data throughput.

DETAILED DESCRIPTION OF EXEMPLARY EMBODIMENTS

Various embodiments of the present invention are now described in detail. In the following discussion, the exemplary wireless system is presumed to include a network of radio cells each served by a transmitting station, known as a cell site or base station. The radio network provides wireless communications service for a plurality of transceivers (in most cases, but not required to be, mobile). The network of base stations working in collaboration allows for wireless service which is greater than the radio coverage provided by a single serving base station. The individual base stations are connected by another network (in many cases a wired network), which includes additional controllers for resource management, and in some cases access to other network systems (such as the Internet) or Metropolitan Area Networks (MANs).

Notwithstanding, it will be readily appreciated that the principles of the present invention may be practiced using other types and configurations of cellular network, the foregoing being used merely to illustrate the various aspects of the invention in one exemplary context.

Moreover, while discussed throughout in regards to cellular networks, it will be recognized by those of ordinary skill that the present invention is not so limited, and may be applied to other types and configurations of networks, cellular or otherwise. Most saliently, several closely related technologies (e.g., Wi-Fi and WiMAX based networks) may directly benefit from the present invention within point-multipoint type topologies.

Furthermore, as discussed previously herein, the coordinated set of base stations includes a first serving base station and multiple supplemental base stations operating in concert as a coordinated set. In other network topologies, there may not be a distinction between a serving base station and supplemental base stations, or that individual ones of the coordinated set may take turns being the "serving" base station, etc. For example, in one implementation, there is no distinction between serving and supplemental base stations; one of the base stations is chosen to transmit the initial data packet, and subsequent base stations follow sequentially. This implementation may be useful in Single Frequency Networks (SFN) (e.g., WiMAX, etc.) or other macro-diversity type technologies, as well as ad hoc networks (e.g., Wi-Fi, etc.) or localized wireless networks. Alternatively, in other implementations, there may be a serving base station, and supplemental base stations, however the role of serving base station is rotated, or dynamically assigned.

LTE and LTE-Advanced Networks

Figure 2:
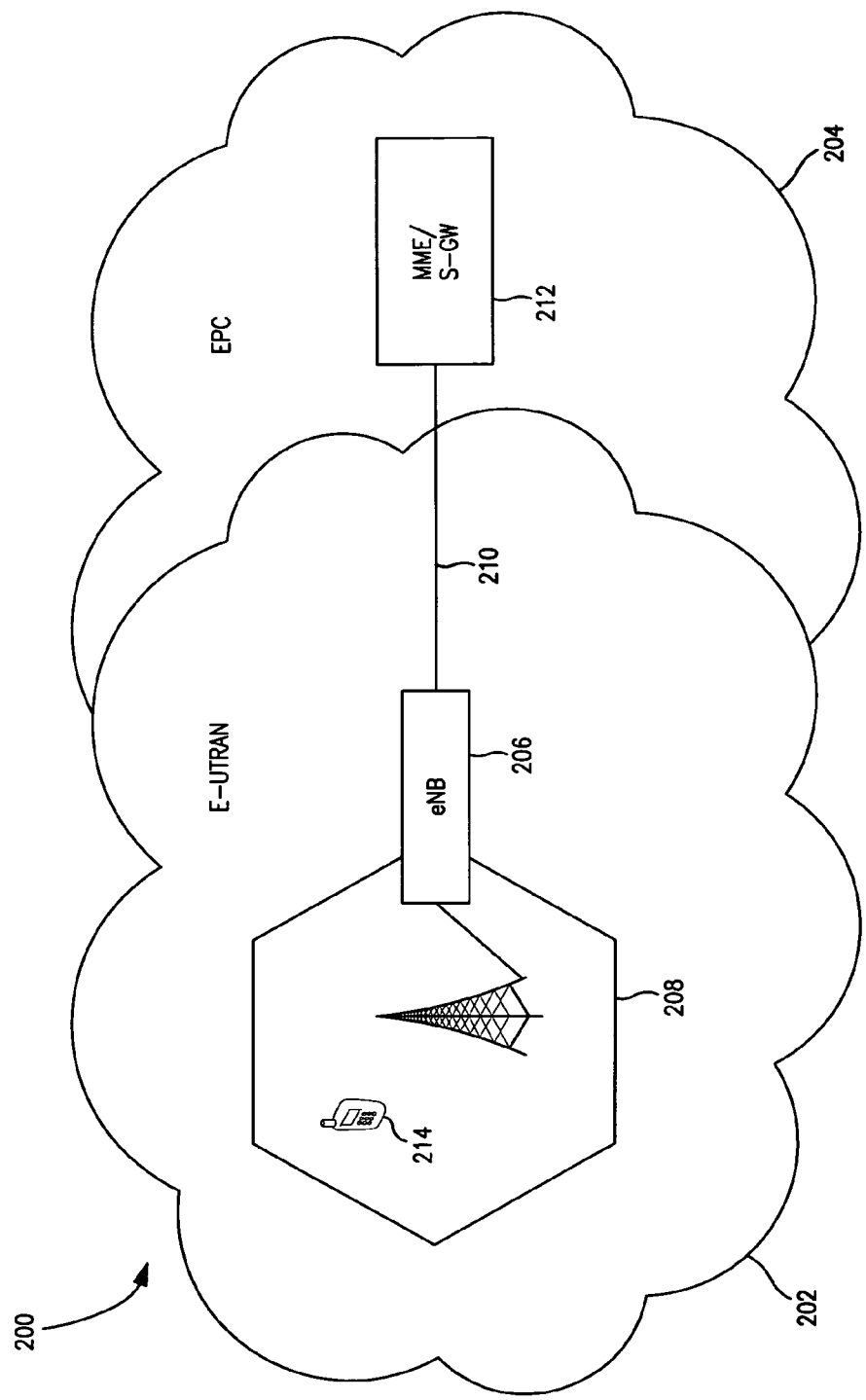
FIG. 2 is a graphical illustration of one embodiment of an LTE network according to the invention, comprising an Evolved Packet Core (EPC), and an Evolved UMTS Terrestrial Radio Access Network (E-UTRAN).

FIG. 2 is a high-level diagram of an exemplary LTE cellular radio system 200 comprising the E-UTRAN 202 (Evolved UMTS Terrestrial Radio Access Network) and the Core Network EPC 204 (Evolved Packet Core). The E-UTRAN consists of a number of base stations 206 (such as eNodeBs (eNBs)). As used herein, the term base station is meant to include any wireless communications station. Such wireless communications stations include macrocells, femtocells, microcells, picocells, access points, etc. Each base station provides radio coverage for one or more mobile radio cells 208 within the E-UTRAN. In LTE, each eNB is connected to the EPC via a S1 interface 210. The eNBs directly connect to two EPC entities, the MME (Mobility Management Entity) and the Serving Gateway (S-GW) 212. The MME is responsible for controlling the mobility of UEs 214 located in the coverage area of the E-UTRAN. The S-GW handles the transmission of user data between the UE and the network. As used herein, the terms "user equipment (UE)", "mobile device", "client device" and "user device" include but are not limited to laptop or handheld computers, PDAs, personal media devices (PMDs), cellular telephones, smart phones, or any combinations of the foregoing. Moreover, it is appreciated that a single device may have one or more combinations of UE and base station functionality.

Figure 3:
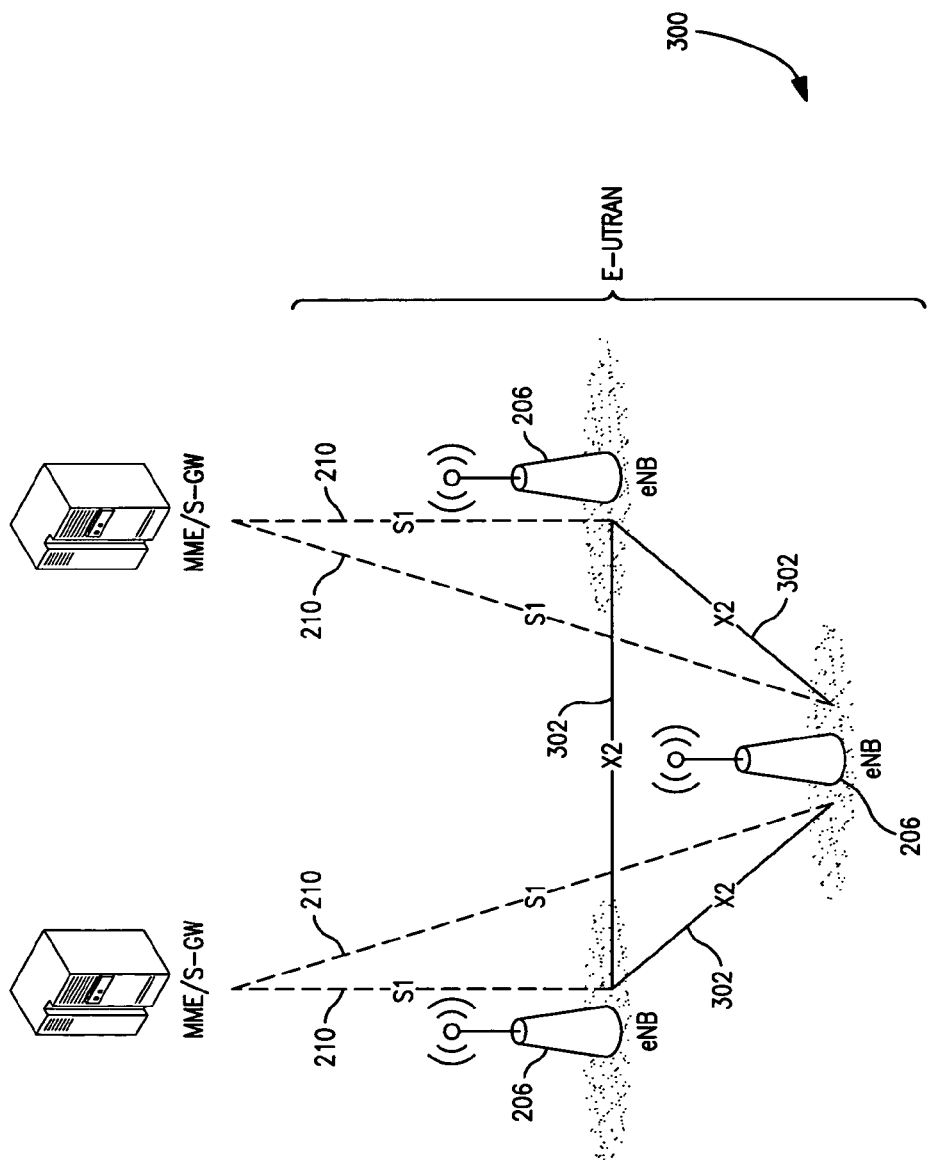
FIG. 3 is a graphical illustration of an exemplary E-UTRAN architecture comprising three eNodeBs according to the present invention.

In E-UTRAN, the eNodeBs 206 control the majority of RNC (Radio Network Control) functionality, and are generally more "intelligent" than legacy base stations (i.e., the UMTS NodeBs of a UTRAN system). FIG. 3 shows a detailed view of an exemplary E-UTRAN architecture, comprising three (3) eNodeBs (eNB). In LTE, eNodeBs are interconnected with each other by means of the X2 interface 302 of the type well known in the cellular arts. Furthermore, eNodeBs are connected by means of the S1 interface 210 to the Evolved Packet Core (EPC). The S1 interface (as defined by 3GPP) supports a "many-to-many" relation between the EPC and eNodeB. Theoretically, different operators may simultaneously operate the same eNodeB.

Base stations (BSs) transmit control and user data to User Equipment (UP) over an air interface (i.e., a radio interface). The LTE Radio Access Technology (RAT) specifies downlink radio transmissions (i.e., BS to UE) based on OFDMA (Orthogonal Frequency Division Multiple Access) in combination with TDMA (Time Division Multiple Access). OFDMA/TDMA is a multicarrier, multiple user access method which provides each subscriber a number of subcarriers in the frequency domain for a defined transmission time. The uplink direction (i.e., UE to BS) is based on SC-FDMA (Single Carrier Frequency Division Multiple Access)/TDMA.

Figure 4:
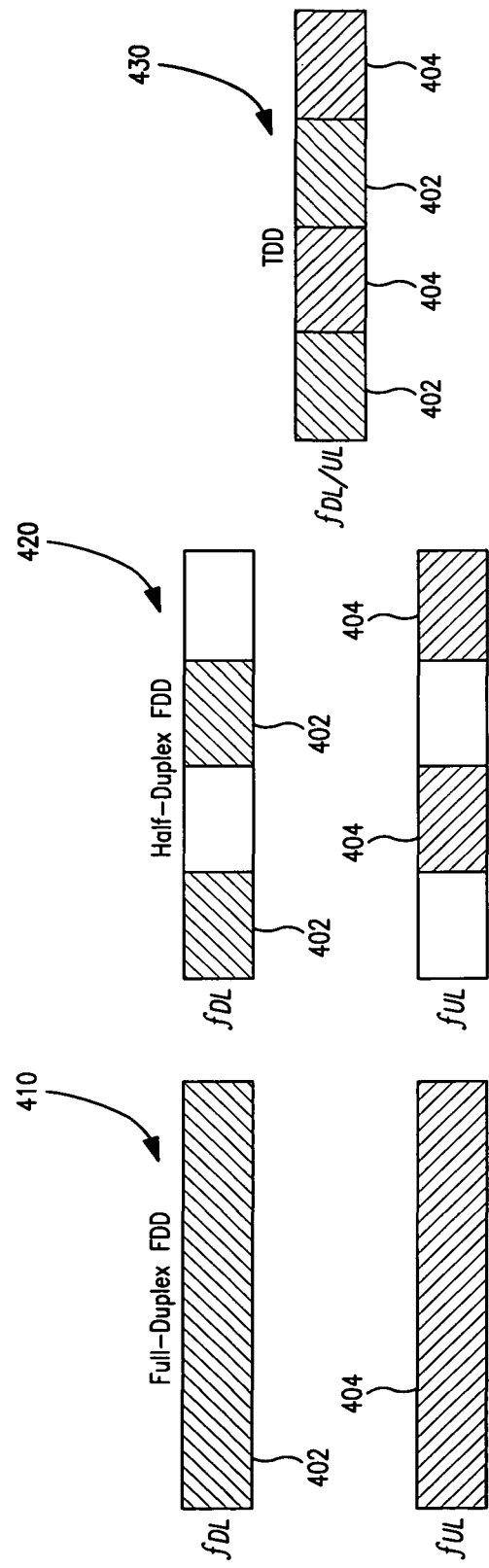
FIG. 4 is a graphical representation of various prior art duplex methods including full-duplex FDD (frequency division duplexing), half-duplex FDD, and TDD.

The LTE RAT supports various duplexing modes. As shown in FIG. 4, LTE supports: full-duplex FDD 410 (Frequency Division Duplex), half-duplex FDD 420 and TDD 430 (Time Division Duplex). Full-duplex FDD uses two separate frequency bands for uplink 404 and downlink 402 transmissions, and both transmissions can occur simultaneously. Half-duplex FDD also uses two separate frequency bands for uplink 404 and downlink 402 transmissions, but both transmissions are non-overlapping in time. TDD uses the same frequency band for transmission in both uplink 404 and downlink 402. For TDD, the direction of transmission is switched between uplink and downlink within a given time frame.

Figure 5:
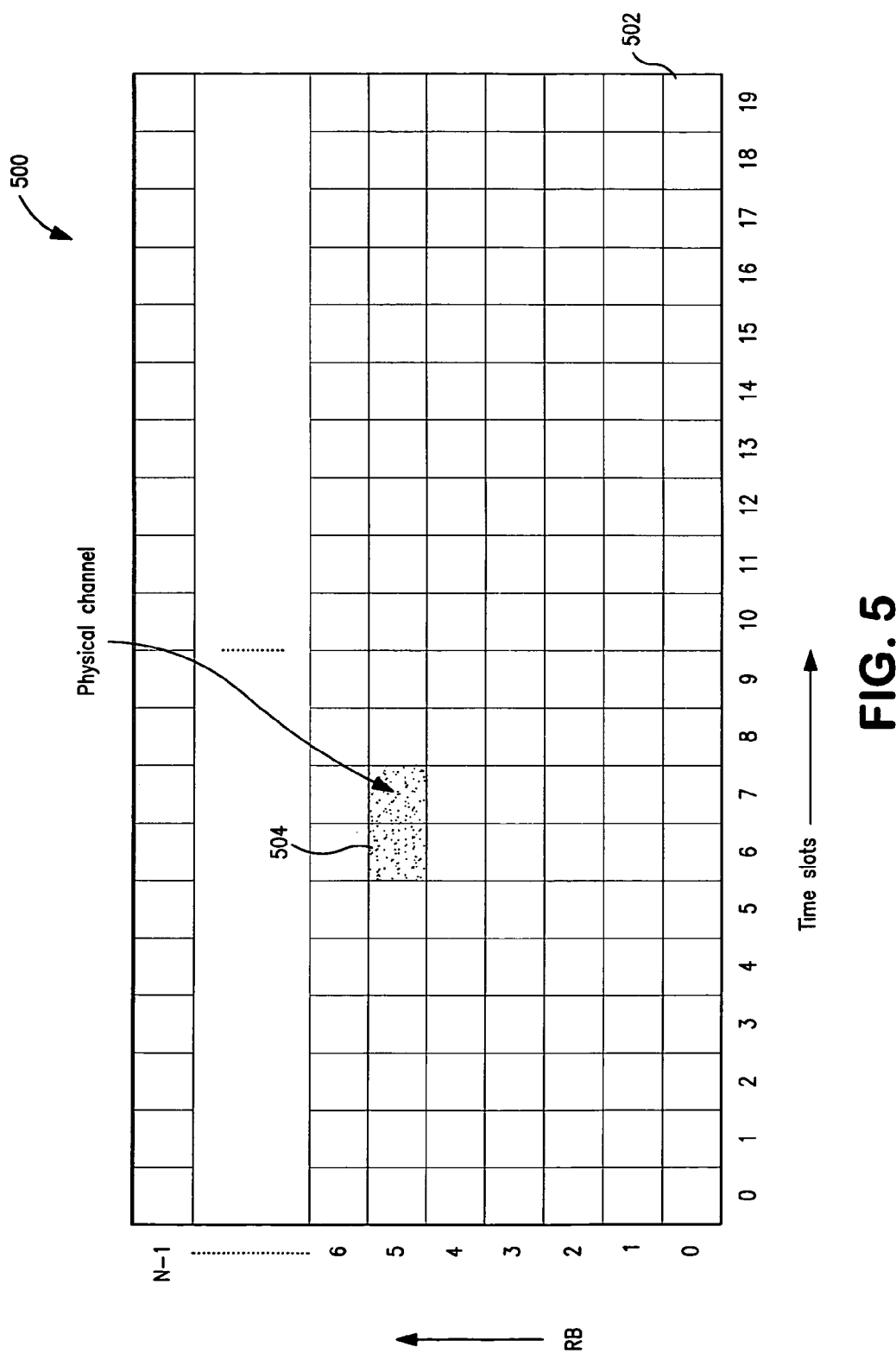
FIG. 5 is a graphical representation of resource blocks as represented in time and frequency resources in Orthogonal Frequency Division Multiple Access/Time Division Multiple Access (OFDMA/TDMA) schemes according to the prior art.

FIG. 5 illustrates one exemplary time-frequency representation of an LTE Radio Access Technology (RAT) 500. In the frequency-domain, the available spectrum is separated into so-called "Resource Blocks" (RB) 502. A RB in this implementation is 180 kHz and consists of twelve (12) subcarriers. The time-domain is separated into radio frames of length 10 ms. Each radio frame consists of 20 (twenty) time slots of length 0.5 ms, numbered from 0 to 19. A subframe is two consecutive time slots. So, for example, for full-duplex FDD, 10 (ten) subframes are available for downlink transmission and 10 (ten) subframes are available for uplink transmission in each 10 ms interval. A physical channel 504 is defined as a pair of RBs during one subframe (e.g. RB 5 during time slot 6-7).

The flexibility of OFDMA/TDMA enables LTE to support varying bandwidths of 1.4 MHz, 3 MHz, 5 MHz, 10 MHz, 15 MHz, and 20 MHz. Multiple discrete sections of bandwidth may also be aggregated to form a larger bandwidth. For example, twenty-five (25) RBs can support a 5 MHz band, and 100 RBs can support a 20 MHz band. These two bands could be used together to form a 25 MHz aggregate bandwidth.

Figure 6:
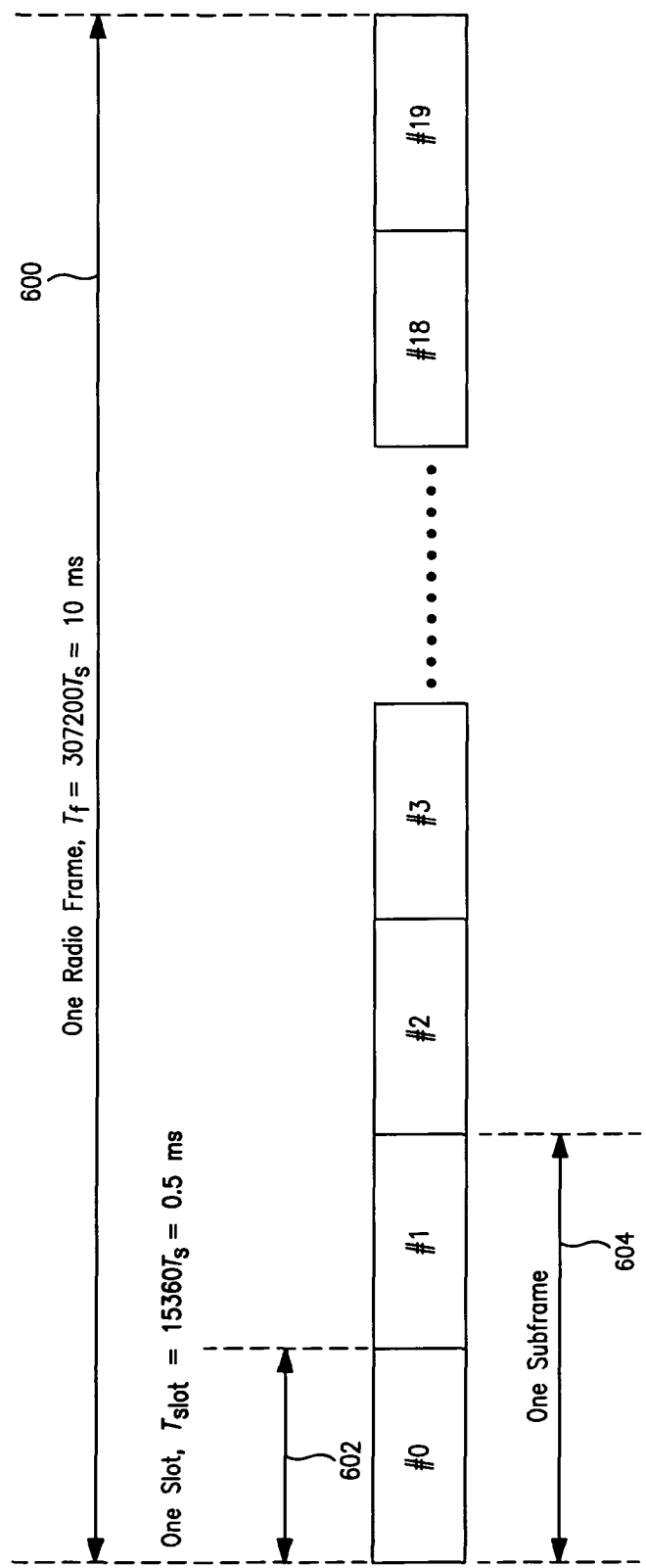
FIG. 6 is a graphical representation of an exemplary frame structure type for a prior art LTE full-duplex FDD and half-duplex FDD system.

LTE networks utilize a standard frame structure type 1 (one) (as shown in FIG. 6) which is used in both full-duplex and half-duplex FDD. Each radio frame 600 is ten (10) ms duration, and consists of twenty (20) slots 602 in 0.5 ms length intervals, numbered from 0 to 19. A subframe 604 is defined as two (2) consecutive slots. For FDD, ten (10) subframes are available for downlink 402 transmission and ten (10) subframes are available for uplink 404 transmissions in each ten (10) ms interval. Uplink and downlink transmissions are separated in the frequency domain. Depending on the slot format, a subframe consists of fourteen (14) or twelve (12) OFDMA symbols in downlink, and fourteen (14) or twelve (12) SC-FDMA symbols in uplink, respectively. Details of frame structure and timing are described in 3GPP TS 36.211 entitled "*E-UTRA—Physical channels and modulation*", which is incorporated herein by reference in its entirety.

LTE and LTE-Advanced Physical Channels

Figure 7:
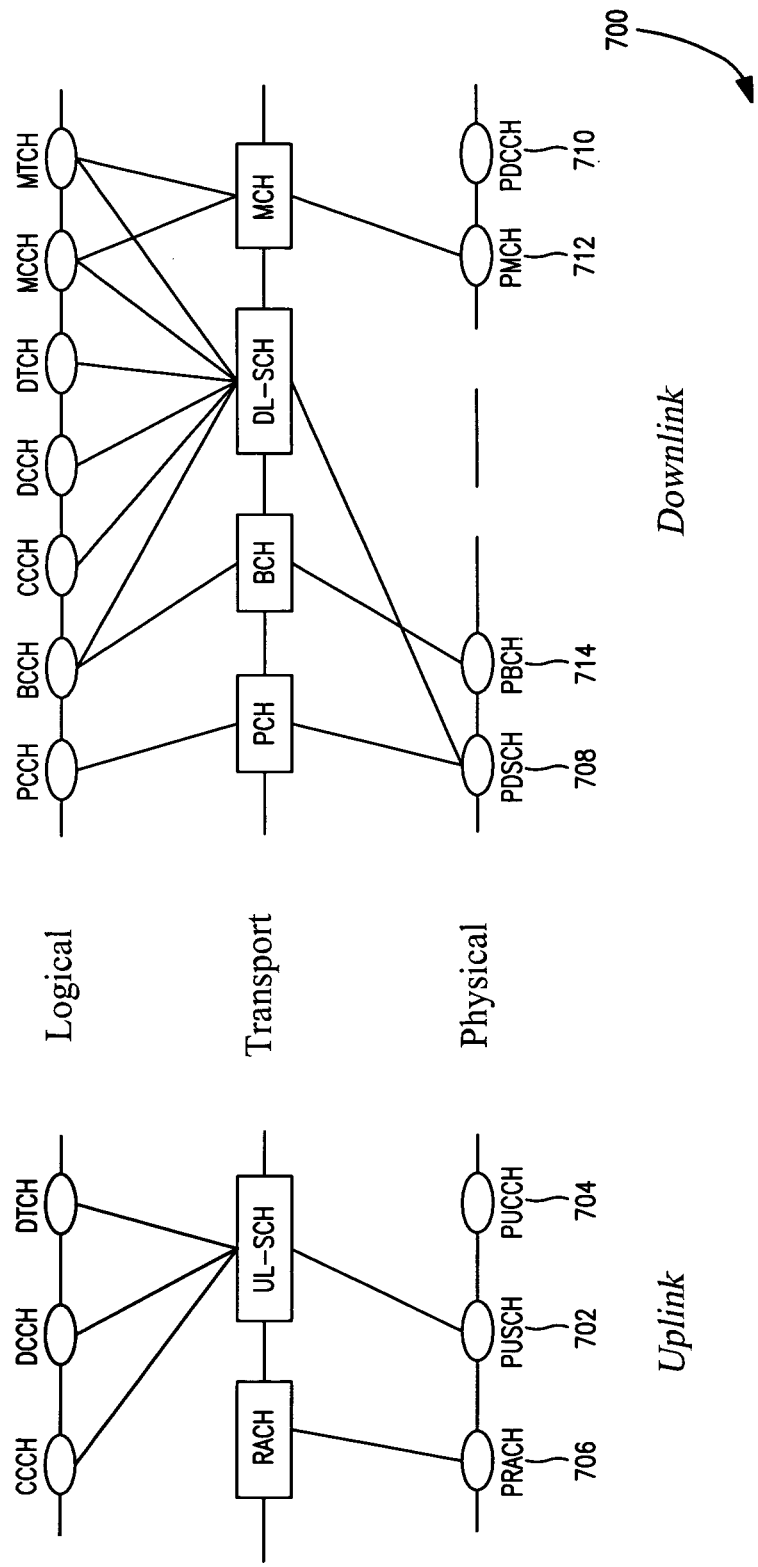
FIG. 7 is a graphical representation of one embodiment of a mapping for logical channels, transport channels, and physical channel, useful in an LTE network, according to the invention.

Extant LTE standards have specified a number of uplink and downlink physical channels for full-duplex and half-duplex FDD operation. Physical channels refer to the physical radio "channels" which carry logical control and traffic information. Logical channels are mapped onto physical channels via transport channels. A logical channel is used for transmitting different types of information between peer entities within the UE and the BS, and a transport channel refers how and with what characteristics the information is transferred over the physical channel. FIG. 7 provides a graphical representation 700 of a mapping for logical channels, transport channels and physical channels used within LTE.

The uplink physical channels include: the Physical Uplink Shared Channel (PUSCH) 702, the Physical Uplink Control Channel (PUCCH) 704, and the Physical Random Access Channel (PRACH) 706. The PUSCH is primarily used for uplink user and control data and encapsulates several logical channels. The PUCCH is only used within the physical layer, and has no logical channels. The PUCCH carries physical channel control information such as HARQ ACK/NACKs (see the discussion presented subsequently herein relating to "Prior Art Hybrid Automatic Repeat Request (HARQ)"), scheduling requests, and Channel Quality Indicator (CQI) reports.

The downlink physical channels include: the Physical Downlink Shared Channel (PDSCH) 708, the Physical Downlink Control Channel (PDCCH) 710, the Physical Multicast Channel (PMCH) 712, and the Physical Broadcast Channel (PBCH) 714. The Physical Control Format Indicator Channel (PCFICH) and the Physical HARQ Indicator Channel (PHICH) are not shown in FIG. 7, but are also physical channels used within LTE. The PDSCH is primarily used for downlink user, control data and paging messages. Similar to the PUCCH, the PDCCH does not have any associated logical channels. The PDCCH carries physical control information such as resource assignments, HARQ information, etc. The PBCH is used to broadcast system information, such as downlink bandwidth information, etc.

The PDSCH 708 occupies any OFDMA symbols in a subframe not occupied by the other physical channels (e.g., the PDCCH, PCFICH, etc.). Furthermore, the PDCCH 710 may occupy one (1), two (2), three (3) or four (4) OFDMA symbols in the first slot of a subframe. The number of symbols used for PDCCH is constantly adjusted by the network and signaled on the PCFICH.

The PCFICH is a downlink physical channel used for identifying (to the UE) the number of OFDMA symbols used for the PDCCHs. The PCFICH occupies the first OFDMA symbol in the first slot in a subframe. The PCFICH is only transmitted when the number of OFDMA symbols for PDCCH is greater than zero.

The PHICH is a downlink physical channel for signaling HARQ ACK/NACKs in response to uplink transmissions. The PHICH occupies one (1), two (2), or three (3) OFDMA symbols in the first slot in a subframe. The number of symbols is adjusted by network and signaled on the PBCH.

Figure 8:
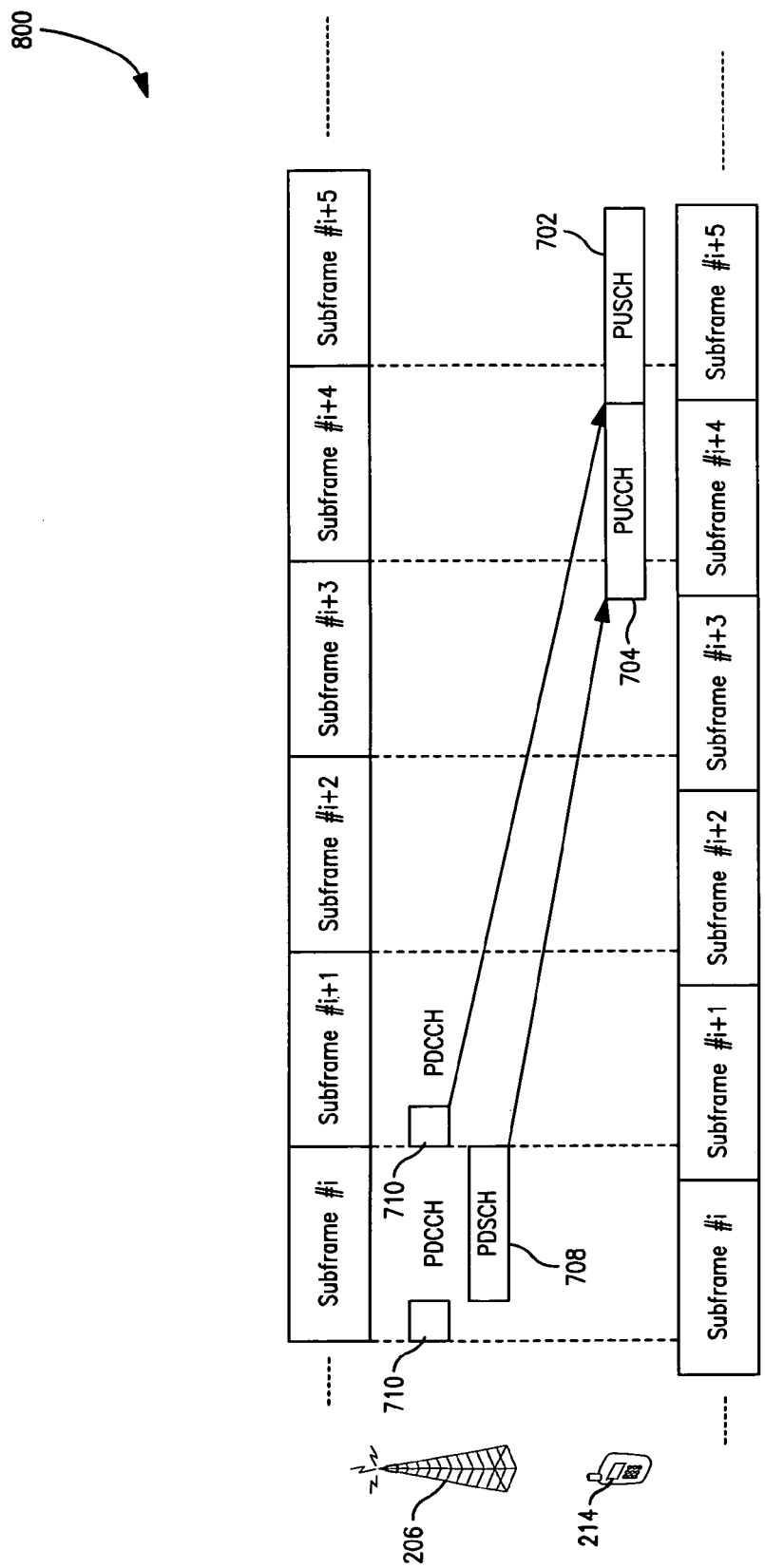
FIG. 8 is a graphical representation of the timing relationships of one embodiment of a Hybrid Automatic Repeat Request (HARQ) scheme, useful in an LTE network, according to the invention.

FIG. 8 illustrates the exemplary uplink/downlink transmission timing diagram 800 for timing relationships between the aforementioned physical channels, as used in LTE full-duplex FDD operation. A base station 206 and a UE 214 have some small difference in time, as represented by the shifted time base. In this example, the base station transmits a first PDCCH 710 indicating the UE a downlink data transmission on subsequent PDSCH 708 (e.g., a logical request) at subframe #i. The base station also transmits a second PDCCH (carrying Downlink Control Information (DCI) format zero (0), for uplink grant) at subframe #i+1 to grant the UE uplink access on PUSCH.

The UE detects the first PDCCH 710 transmission, and determines that it should decode and respond to the subsequent PDSCH 708. The UE transmits its response to the PDSCH 708 with a PUCCH 704 (e.g., an ACK/NACK) at its subframe #i+4. The UE responds with a PUSCH 702 (e.g., a logical response) at subframe #i+5 according to the second PDCCH.

Prior Art Hybrid Automatic Repeat Request (HARQ)

In prior art LTE network operation, the Hybrid Automatic Repeat Request (HARQ) mechanism is a method for so-called "backward error correction". HARQ is used in both uplink and downlink directions, and in both full Frequency Division Duplex (FDD) and half duplex FDD operation. As is well known, backward error correction schemes (e.g., HARQ, ARQ, etc.) balance the trade-offs between code rate and error correction.

During HARQ operation each transmission of data (control or user data in uplink and downlink) in a transport block within a subframe is positively (ACK) or negatively acknowledged (NACK) by the receiver. Within 3GPP, the "transport block" is a data structure generated in the MAC (Medium Access Control) sub-layer. The transport block represents the information bits to be transmitted. In the physical layer, the transport block is coded into a data packet for transmission, where the data packet has additional code redundancy and error correction capabilities. If a transport block has been successfully decoded from received data packets, the sender may send a new transport block in the next related subframe. If a transport block has not been successfully decoded, the sender will re-code the payload of the transport block (potentially with alternate redundancy, code rates, etc.), and re-transmit the new data packet in the next related subframe. Corrupted data packets are stored at the receiver. Initial and subsequent transmissions are soft-combined and jointly decoded by the receiver. With each HARQ re-transmission, additional redundancy information greatly improves the chances of successful channel decoding, however, the overall code rate is decreased.

Within the communications arts, certain techniques (such as HARQ) use "combining" for the decoding of multiple transmissions. There are two types of combining, (i) hard combining and (ii) soft combining. In a hard combining approach, each bit is assigned a "hard" value (i.e., either a one (1) or a zero (0)). Hard combining is performed after the transmissions have been quantized to bits. In contrast, a soft combining approach assigns each bit a value and a certainty. Thus, a soft decoder may be very confident, confident, not confident, very not confident, etc. for each bit (typically signified with a value e.g., a value selected from [127 . . . –127]). Soft combining uses the certainty of each bit as a "weighting" function for the value of each bit during decoding. Moreover, when used in combining multiple transmissions, soft combining accumulates certainty information for each bit, thereby further improving the probability of success.

Current standards for LTE HARQ specify a fixed time interval between data transmission and acknowledgements, and between acknowledgements and re-transmissions. Normal LTE HARQ operation in uplink and downlink is an 8-channel Stop & Wait ARQ mechanism. Each HARQ "sub channel" corresponds to a single subframe transmission. Each subchannel is referred to as a "HARQ process". The receiver must acknowledge a received subframe #i in subframe #i+4 (i.e. four subframes later). Considering the HARQ operation in uplink, after an uplink transmission in subframe #i, the eNodeB is expected to acknowledge the uplink data reception in subframe #i+4. For unsuccessful transmissions, the UE is expected to re-transmit the data in subframe #i+8; for successful transmissions, the UE is expected to transmit the next transport block in subframe #i+8. Thus, there are only eight (8) possible HARQ processes (#i, #i+1, #i+2 #i+7).

The aforementioned timing requirements are required in both full-duplex and half-duplex operation. Consequently, LTE half duplex operation must also ensure that transmissions in the uplink and downlink are switched, such that for each transmission the related acknowledgements and re-transmissions can comply with the fixed time relationships.

In the exemplary LTE networks, HARQ re-transmissions are categorized as using either (i) chase combining, or (ii) incremental redundancy re-transmissions. Chase combining re-transmissions are individually decodable, and are identical to the initial transmission (i.e., the re-transmitted data contains the same information and redundancy as the initial transmission).

Alternatively, incremental redundancy re-transmissions provide different redundancy bits compared to the initial transmission, and may or may not be individually decodable.

Incremental redundancy re-transmissions which are individually decodable contain the same information as the initial transmission, whereas incremental redundancy re-transmissions which are not-individually decodable only contain new redundancy bits (i.e., they augment or supplement the initial transmission, but do not contain the original information).

Cell Edge Efficiency

Referring back to FIG. 1, the aforementioned Coordinated Multipoint Transmission/Reception (CoMP) 100 approach manages coordinated base stations 104 for servicing the UE 102. As shown in FIG. 1, the UE retains distinct connections to each of the base stations. However, as can be appreciated, the coverage of the UE at the cell boundary is significantly attenuated for each of its connections. Furthermore, the reduced effective code rate of HARQ operation (and backward error correction in general), and multiple re-transmissions due to poor signal quality, are further exacerbated by the multiple connections to each of the coordinated base stations. Accordingly, improvements to cell edge efficiency for HARQ operation, especially within CoMP scenarios, are greatly desired.

Various approaches to improving service via base station operation near cell edge boundaries are evidenced in the prior art. For example, in the previously mentioned typical LTE FDD mode, there are eight (8) HARQ processes in the uplink for HARQ operation; however, a special "TTI bundling" feature is used to improve the uplink coverage for VoIP (Voice over IP) traffic. TTI (Transmission Time Interval) bundling addresses the low uplink budget at cell edges. Normal UE operation is limited to one millisecond (1 ms) subframe durations, and a maximum transmit power of 23 dBm (approximately 0.2 Watts). The TTI bundling feature transmits VoIP packets over a larger time span, thereby increasing the received energy at the receiver.

Figure 9:
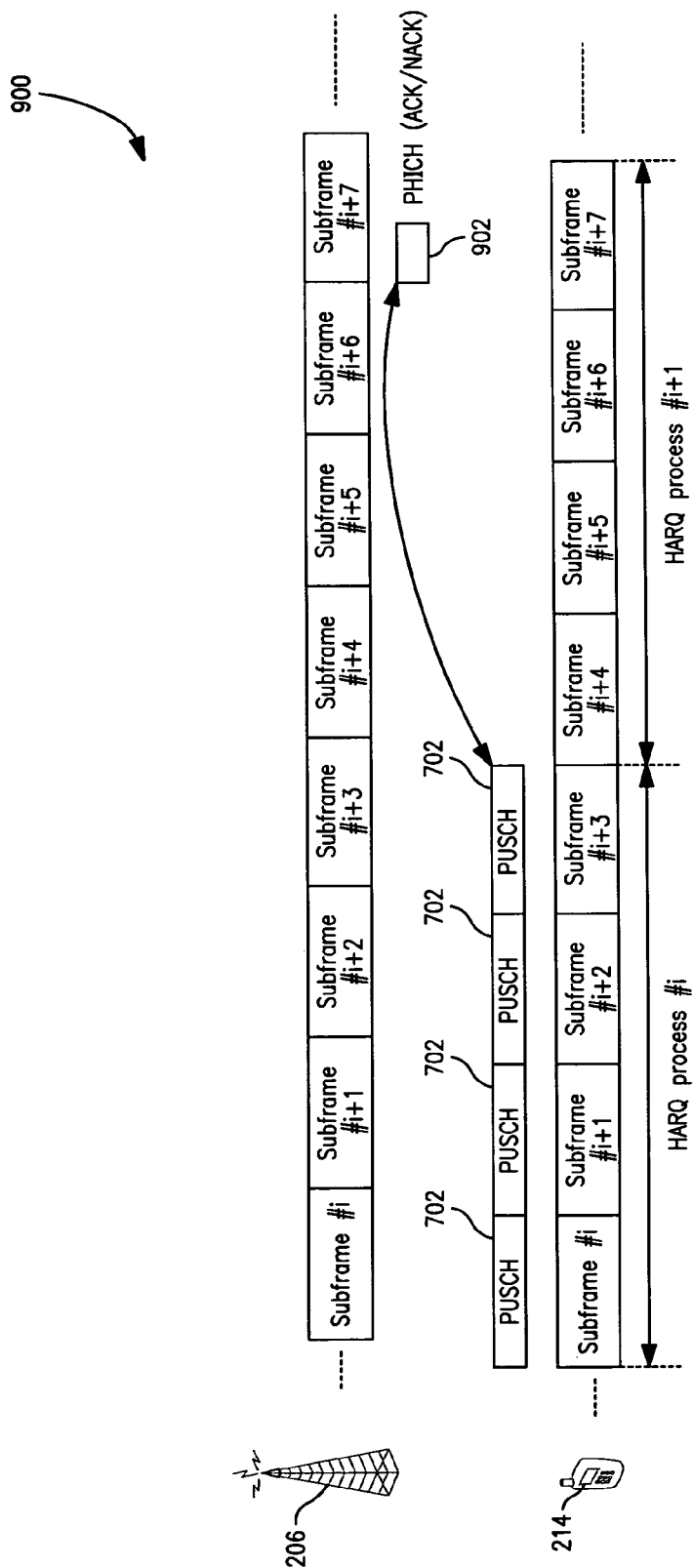
FIG. 9 is a graphical representation of the timing relationships of one prior art embodiment of an uplink bundled acknowledgment scheme useful in one implementation of a Hybrid Automatic Repeat Request (HARQ) scheme.

FIG. 9 illustrates one prior art TTI bundling transaction. TTI bundling operation is enabled and disabled by the eNodeB 206 over RRC (Radio Resource Control) signaling. During TTI bundling, all uplink transmissions from the UE 214 using PUSCH 702 are "bundled" in a set of four (4) consecutive uplink subframes. Each transport block is coded and transmitted in the set of bundled subframes (i.e. all four (4) subframes contain the same information bits but with different redundancy versions). The receiver at eNodeB soft-combines and jointly decodes the TTI bundle (i.e., the four (4) subframes). A HARQ ACK/NACK 902 of the bundle is sent in response to the last subframe of the bundle (i.e., if the last subframe in a bundle is subframe #i, then the ACK/NACK is transmitted in subframe #i+4).

TTI bundling is designed to operate within existing LTE HARQ operation; accordingly, TTI bundling has fixed parameters. For example, the same HARQ process number is used in each of the bundled subframes (unlike normal HARQ which uses a separate HARQ process number for each subframe). Each bundle is treated as a single resource, i.e. a single grant for resource allocation, and a single HARQ acknowledgement is used for each bundle. Re-transmissions of a TTI bundle are also a TTI bundle. Lastly, the timing relationships between the last subframe in the bundle and the transmission of the HARQ acknowledgement are identical to normal operation.

In another such example, UMTS W-CDMA FDD (and other CDMA standards) implements "soft handover" procedures near cell boundaries. Soft handover may more generally be referred to as macro-diversity transmission. In soft handover, the UE has radio links to more than one cell. In UMTS W-CDMA FDD implementations, soft handover is only applied for intra-frequency cells (i.e., cells operating in the same frequency band), and the UE is required to support a maximum of six (6) distinct radio links.

During soft handover, the downlink channels transmit the same user data over all radio links to the UE. In uplink, the user data is decoded in each involved cell/NodeB. The decoded uplink data is delivered to the network controller for combining. The UE and the network maintain an Active Set (AS) of radio links simultaneously involved in the communication between the UE and the network. Based on measurements provided by the UE, the network may dynamically add, replace, or remove cells in the AS. Ideally, the AS contains the strongest cells, i.e. the cells with the best signal quality.

One advantage of a soft handover is that the link quality between the NodeB and UE can be significantly improved. However, radio resources from multiple cells are required, and additional downlink interference is created in multiple cells. Further, in a prior art soft handover, HARQ is performed in both uplink and downlink, but no bundling of HARQ processes is used.

Bundled Acknowledgment

Despite the foregoing, the prior art fails to provide adequate solutions for simultaneously servicing a UE from multiple coordinated BSs, and efficiently utilizing spectral resources. In one aspect of the present invention, improved methods and apparatus are disclosed for "bundling" backward error correction to address the foregoing problems.

Specifically, in one embodiment, the serving base station of the coordinated base stations (shown in FIG. 1) supplements its coverage with supplemental base stations, where each supplemental base station provides re-transmission capability. However, in this model, the serving base station still retains control of acknowledgments.

In another embodiment, acknowledgement signaling for a group of coordinated base stations is bundled together. Moreover, any arbitrary number of consecutive subframes may be bundled together, of which each ones of the coordinated cells is allocated only a fraction of the total subframes. Coordination and signaling for the improved management of supplemental base stations and UEs may also be employed.

Advantageously, implementation of certain aspects of the present invention will enable each base station of the coordinated set to, inter alia, reduce their necessary transmit power, thereby minimizing interference with their neighboring base stations (also generally referred to as Inter-Cell Interference (ICI)). In prior art implementations, the transmission power of the serving base station's initial transmission is calibrated to reduce the number of re-transmissions. In contrast, in one exemplary embodiment of the present invention, the serving base station and supplemental base stations each transmit a different redundancy of the same data block. The re-transmission is not triggered unless the soft combination of the aggregate redundancy of all coordinated base stations is unsuccessfully decoded. Thus, the transmission power of all of the base stations may be calibrated to reduce the number of re-transmissions. By reducing the transmission power of each base station, overall spectral efficiency of the Radio Access Network (RAN) is greatly improved.

Moreover, implementation of certain aspects of the present invention may also greatly contract the overall time for acknowledgement and successful decoding of transport blocks. In prior art implementations, the UE receives a single data packet, and based on the successful or unsuccessful decoding of the transport block, the UE transmits an acknowledgment. Furthermore, the UE acknowledgment is scheduled at a fixed time, regardless of the speed of the decoding (for example, even if the UE immediately decoded the transport block, the acknowledgment is scheduled at a much later subframe). In contrast, in one exemplary embodiment of the present invention, the UE receives two or more data packets having redundant versions of the same transport block before it is scheduled to transmit its acknowledgment. Accordingly, the UE has a much higher chance of correctly decoding the transport block, thereby minimizing subsequent re-transmissions. In another variant, the number of redundant versions transmitted to the UE may be dynamically added, replaced, or removed so as to improve overall network operation. For example, a coordinated set of a first serving base station, and second, third, and fourth supplemental base stations, may adjust the acknowledgment schedule with the UE, so as to contract response times.

Methods

Figure 10:
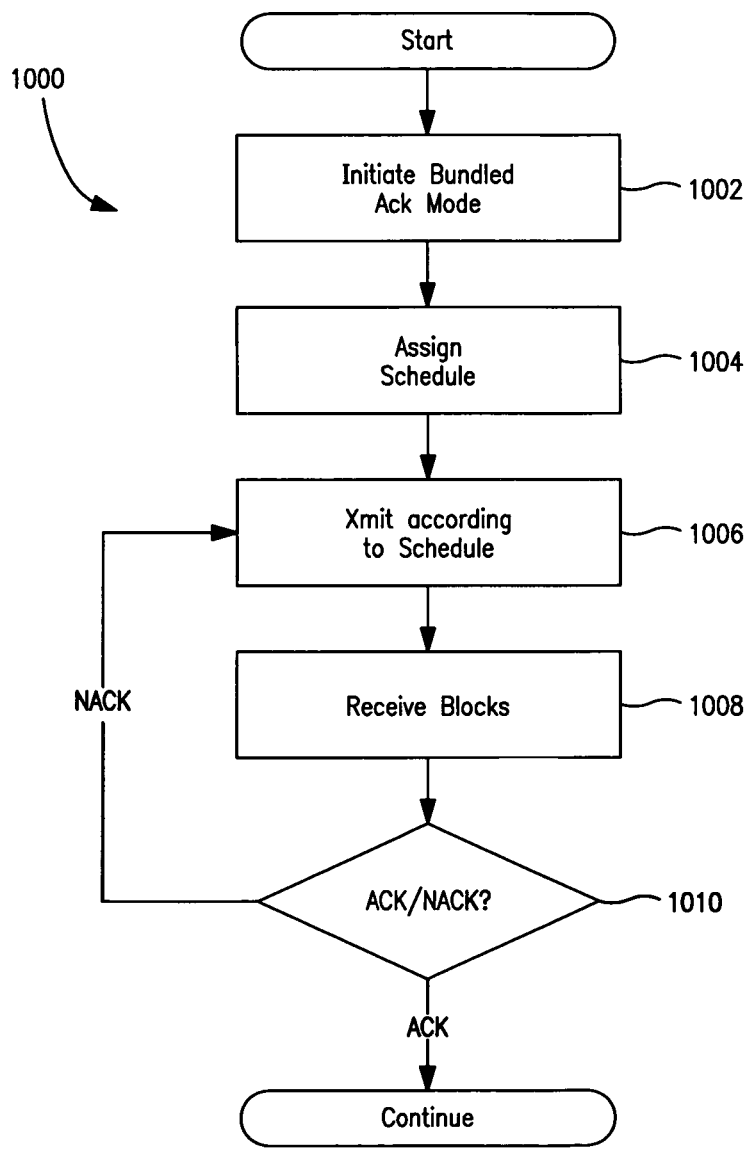
FIG. 10 is a logical flow diagram of one embodiment of the generalized process for bundled acknowledgment operation in accordance with the present invention.

Referring now to FIG. 10, one embodiment of the generalized method 1000 for sharing acknowledgments between coordinated base stations according to the invention is described. It will be recognized that while several of the embodiments presented herein are described within the context of cellular networks, other types of networks are contemplated consistent with the invention (e.g., ad hoc networking, wireless local area networking, etc.) as previously noted. In fact, virtually any point-multipoint type topology may readily use and benefit from one or more aspects of the disclosed invention.

Moreover, in the context of the following discussion, an acknowledgment message acknowledges the decoding status of a transport block. Positive acknowledgements or ACKs are used to indicate successful decoding (either with a single data packet, or cumulative data packets) of a transport block. Negative acknowledgments or NACKs, are used to indicate unsuccessful decoding of a transport block (either alone, or cumulatively). Currently, LTE HARQ does not provide missing acknowledgement (or non-acknowledgement messages); however, it is appreciated that in other technologies, such a non-acknowledgement message maybe utilized consistent with the present invention.

At step 1002 of the method 1000 of FIG. 10, the coordinated set of base stations initiates a bundled acknowledgment coordination mode. In one embodiment, the bundled acknowledgment coordination mode is initiated upon the occurrence of one or more trigger events (such as e.g., predefined events, monitored by the base station or mobile device, which are indicative of an opportunity to optimize or simply modify the current transceiver operation). In one such variant, the switch between normal operation and the aforementioned bundled acknowledgment operation is triggered within the Radio Resource Control (RRC) layer software running at the BS (UTRAN, E-UTRAN). The RRC layer controls radio connection, disconnection, and system information broadcasts. It is appreciated that the trigger could be implemented elsewhere within the network. The trigger event comprises, for example, changes in signal quality values (e.g., rising or falling of Channel Quality Indicator (CQI), Signal to Noise Ratio (SNR), Bit Error Rate (BER), etc.).

In another embodiment, the trigger event(s) comprise RRC mode changes in order to support a differing quality of service (QoS). For instance, the trigger event might occur if the RRC determines that the peak data rate required by the UE cannot be provided at a cell boundary with current connection capability; a trigger event (in the form of e.g., a signal message) will tell the RRC and or the UE that a higher quality of service mode (such as the aforementioned bundled acknowledgment operation) is needed.

In yet another embodiment, the bundled acknowledgment coordination mode is initiated by request. For example, the request can be initiated by a high-level software application, in anticipation of increasing requirements for coverage; e.g., a VoIP software application that determines that current or future requirements for robust voice delivery mandate improved connection quality. Such a request for connection improvement may cause an otherwise normally operating mobile device to enable "bundled acknowledgment" operation.

In another instance, a high level network entity (e.g., network controller or supervisory process) may determine that the current spectral resource utilization for supporting a mobile device from a first base station within a cell boundary causes excessive inter-cell interference with nearby base stations. Accordingly, the network entity may dictate bundled acknowledgment operation for a set of base stations, thereby causing the initiation of a coordinated set (and reducing the ICI).

At step 1004 of the method 1000, the coordinated set of base stations is assigned a schedule and a data block (e.g., transport block) for transmission. In one embodiment, the schedule is determined by a single base station. The single base station or the "serving" base station manages a number of other base stations (the "supplemental" base stations). In one variant of this approach, the serving base station determines a schedule that identifies a transmit time for each one of the coordinated base stations. The transport block for transmission is distributed from the serving base station, to certain ones of the coordinated set. The schedule can be derived in any number of ways, such as e.g., based on analysis by an optimization engine (e.g., software process). The optimization engine may consider for example network activity, radio reception, current usage of the members of the coordinated set, mobile device capabilities, business methods, etc., and may dynamically assign add, replace, or remove members from the coordinated set. Furthermore, the optimization engine may lengthen or shorten the transmission schedule, increase or decrease transmission parameters, etc. It will be appreciated that radio networks may change on a regular or irregular basis; thus, the optimization engine may be run only in response to corresponding changes if desired or, alternatively, may be run continuously.

The optimization engine may additionally exchange information with neighboring base stations or the mobile device, to quickly ascertain optimal conditions. For example, the serving base station may receive a listing of Cell IDs from a mobile device. The serving base station may query each of the corresponding base stations for inclusion to, or exclusion from, the coordinated set.

In one variant, the schedule is exchanged within the coordinated set. Upon determining an appropriate schedule, the serving base station may distribute the schedule among the members of the coordinated set. In one exemplary LTE implementation, the schedule is transmitted via directly from the serving eNB to each of the supplemental eNBs via the X2 interface. It will be appreciated, however, that other communications links may be used for this purpose.

In yet another variant, the schedule does not include the entirety of the coordinated set. A subset of the supplemental base stations may be included within the schedule; however, in certain scenarios, at least a portion of the base stations may be held back. For example, a mobile device having relatively strong signal quality may only need a portion of the coordinated set for signal reception; the serving base station may desire to hold the other non-used members of the coordinated set on "alert" for possible use at a later time (e.g., the mobile device experiences a change in its radio environment, future heavy utilization of one of the currently used coordinated set, etc.).

In one implementation, the foregoing transmission schedule is substantially symmetric, and each base station of the coordinated set is allocated a prescribed number (e.g., one) of subframes. For example, if the coordinated set of base stations comprises a set of L members, then the schedule may comprise L subsequent subframes, each allocated to a corresponding member. In other variants, a coordinated set of base stations may have a number of the members unused, but retain the time reservation. Thus, for L members (e.g., four (4)), the schedule may still be L subframes, split among the used members of the coordinated set (e.g., the serving base station has subframe #i, #i+2; and one supplemental base station has subframes #i+1, #i+3; the other two (2) supplemental base stations are suspended). Similarly, in one alternate embodiment, the schedule may be asymmetrically assigned to members. (e.g., the serving base station has subframe #i, #i+2; and a first supplemental base station has subframe #i+1, and a second supplemental base station has subframe #i+3).

Moreover, the schedule may be statically assigned. Such embodiments may be useful to conserve processing power and coordination burdens of the serving base station, and may be particularly useful is relatively limited capability devices (e.g., femtocells, Wi-Fi APs, etc.). Alternatively, in some higher complexity embodiments, the schedule may be dynamically determined; e.g., the schedule is determined by the serving base station once, and then periodically or semi-periodically re-evaluated, etc.

The schedule can be provided to the mobile device in any number of different ways; e.g., by messaging. In one such variant, the schedule comprises a listing of cell IDs, and an appropriate subframe. Alternatively, the schedule is transparent to the mobile device; i.e., the mobile is unaware of the transmission schedule. Such an embodiment may be particularly useful in single frequency networks (e.g., WiMAX), where the mobile device is not aware of individual cell IDs.

The aforementioned transmission schedule additionally may comprise parameters such as: (i) the number of bundled acknowledgement messages, (ii) the cell IDs of the used members of the coordinated set, (iii) the transmission sequence of the coordinated set, (iv) a redundancy version (or a seed used to determine a redundancy version), (v) an initial frame number for starting bundling operation, (vi) one or more information data blocks to be transmitted, and/or (vii) transmit power. The foregoing parameters are merely illustrative, and not intended as a comprehensive listing of all possibilities.

At step 1006 of the method 1000, each one of the coordinated set of base stations transmits one or more data packets according to the schedule. In one embodiment, the base station converts an initial transport block into a data packet, where the data packet has additional code redundancy and error correction capabilities; such aggregated information transmitted is hence "self-decodable". In an alternative implementation, the base station derives error correction information from the transport block, and transmits only the error correction information; such non-aggregated information augments an initial transmission, and is not self-decodable.

The error correction capabilities of a receiver can be used by that receiver to correct corruptions in the data block. In one variant, the error correction capabilities comprise any one of a convolutional code (e.g., turbo code, Viterbi code), or parity code (e.g., low density parity check (LDPC), etc.). Alternatively, the error correction capabilities can be used by a receiver to identify corruptions in the data block. In one such variant, the error correction capabilities comprise any one of a cyclic redundancy check (CRC), checksum, etc. It is appreciated that various combinations of the foregoing error correction capabilities (corrective, indicative) may be used consistent with the invention.

In one embodiment, each of the base stations transmits the one or more elements of the data at a substantially lower power level when compared to other transmissions. In one such implementation, each of the base stations reduces their transmit power by a fixed fraction (e.g., ½, ⅓, etc.). Alternatively, each of the supplemental base stations may receive a power level assigned by the serving base station. In one such variant, a supplemental base station having better reception than others may be instructed by the serving base station (or another supplemental base station acting as a proxy) to increase its transmit power proportionately. Similarly, a supplemental base station having worse reception may be instructed to decrease or completely discontinue transmission.

Other network parameters or considerations may also be used by the serving base station in determining transmit power schemes. For example, a supplemental base station having better reception may actually reduce its transmit power, thereby improving overall network resource utilization (i.e., it can tolerate more interference, and hence can have its transmit power reduced). Similarly, a supplemental base station which is near areas of heavy network utilization, may have its transmit power reduced rather than contribute to the already crowded radio environment. Other such considerations will be apparent to the skilled artisan when provided the present disclosure.

In one embodiment, one or more of the coordinated set of base stations transmits the one or more elements of the data according to a sequential time order. The sequence of base station transmission is determined by, e.g., a previously assigned schedule.

One or more of the base stations may also transmit without requiring an acknowledgement message from the mobile device. For example, the serving base station may transmit a data packet, which will be combined with supplemental data packet. Accordingly, the serving base station expects to receive an acknowledgment resulting from the combination of multiple data packets. Each supplemental base station can transmit a data packet without direct acknowledgment from the target mobile device (i.e., each supplemental base station receives the acknowledgment from the serving base station).

In another embodiment, each of the transmission elements is configured so as to have a shared identification. The shared identification may include for example a HARQ process. Other types of shared identification may include process identifiers, user identifiers, service identifiers, media stream identifiers, etc.

The aforementioned transmissions may also comprise re-transmission of a previously transmitted data block. In one variant, the re-transmission is transmitted from each coordinated base station with a different redundancy version. The supplemental base station re-transmissions may also be transmitted without requiring an acknowledgment of previous transmissions.

At step 1008 of the method 1000, the mobile device receives bundled transmissions of one or more data blocks. In one implementation, the mobile device receives several transmissions of the same data block. In one such variant, the transport blocks have been coded with different redundancy versions for each data packet. Alternatively, the received data packets are identical. As yet another option, the received data packets comprise a first self-decodable data packet, and several augmenting data packets of the type previously described herein.

The mobile device buffers the bundled transmissions and soft combines and decodes them using mechanisms known to those of ordinary skill in the digital communications arts. In one embodiment, the entirety of the bundled transmission is buffered, and internal error correction capabilities of the received blocks can be used by a receiver to correct corruptions. The error correction capabilities comprise any one of well known techniques such as a trellis code (e.g., turbo code, Viterbi code), or parity code (e.g., low density parity check (LDPC), etc.). In alternate embodiments, the error correction capabilities indicate corruption of the data block, and comprise any one of a cyclic redundancy check (CRC), checksum, etc. As previously noted, various combinations of the foregoing error correction capabilities (corrective, indicative) may be used consistent with the invention.

At step 1010, the mobile device transmits an acknowledgment message to the coordinated set. In one embodiment of the invention, the mobile device provides a positive or negative acknowledgment. For example, in the content of an LTE UE, the UE provides a HARQ ACK or NACK, based on the results of its decoding of the bundled HARQ transmissions.

In alternate configurations, the mobile device indicates a missing transmission or non-acknowledgement. Unlike a negative acknowledgment which indicates a received corrupted packet, a missing transmission or non-acknowledgement indicates that the UE is no longer receiving transmissions from the corresponding BS (e.g., out of range, loss of reception, etc.). Accordingly, the identification of missing transmission or non-acknowledgment may be used by the serving base station to responsively, "prune" undesirable base stations from the coordinated set. The acknowledgement message may also comprise additional decoding result information for process optimization. For example, the mobile device may provide a channel quality indication, whereby the serving base station may responsively add, replace, and/or remove base stations of the coordinated set, to effectively increase or decrease signal receptivity. In one such case, a mobile device receiving too little signal strength may require a larger coordinated set, or perhaps more transmit power from the existing coordinated set Conversely, a mobile device receiving too much signal strength may be serviced more efficiently with a smaller coordinated set, and/or less transmit power. In one variant, the aforementioned acknowledgment message comprises an itemized power calculation for each one of the coordinated set of base stations. Such itemization may be further used by the serving base station's optimization engine, to further improve network utilization and robustness.

The acknowledgment message is received by the serving base station, and repeated to each of the coordinated set, via intra-base station communication. Alternatively, the acknowledgment is sent to a supplemental base station, and repeated to each of the coordinated set, including the serving base station.

The aforementioned acknowledgment message can be sent at a specified time instance if desired. In one exemplary variant, the acknowledgment is sent at an appropriate HARQ process time interval. In other variants, the acknowledgment is sent at a scheduled subframe (i.e., not necessarily at a HARQ process interval). Yet other options will be recognized by those of ordinary skill given the present disclosure.

In one embodiment, a negative acknowledgment (HACK) triggers a re-transmission of the data block (see step 1006), and a positive acknowledgment (ACK) triggers a transmission of a new data block (see step 1010). Optionally, the coordinated set may continuously monitor the immediate radio surroundings to dynamically change its settings (step 1002 of FIG. 10). For example, a supplemental base station may at a later point determine that it should assume serving base station properties (e.g., as may be useful for handoff), or vice versa. In another example, if the quality of service of an established call between the ones of the coordinated set and the mobile device degrades, then the serving base station may autonomously reselect one of the previously suspended base stations for correcting the degradation. Alternatively, the existing base station may request a list of nearby cell IDs from the mobile device, to best determine another base station to add.

Such monitoring may include for example detection of activity changes to neighboring active base stations, changes to detected network load, statistics related to time of operation of neighboring cells, and or changes to one or more characteristics of the detected spectrum, expected time of operation of the cell under consideration, changes to one or more capabilities of the coordinated set, changes to operator account information, changes to the current location, cell ID, etc.

Exemplary Serving Base Station Apparatus

Figure 11:
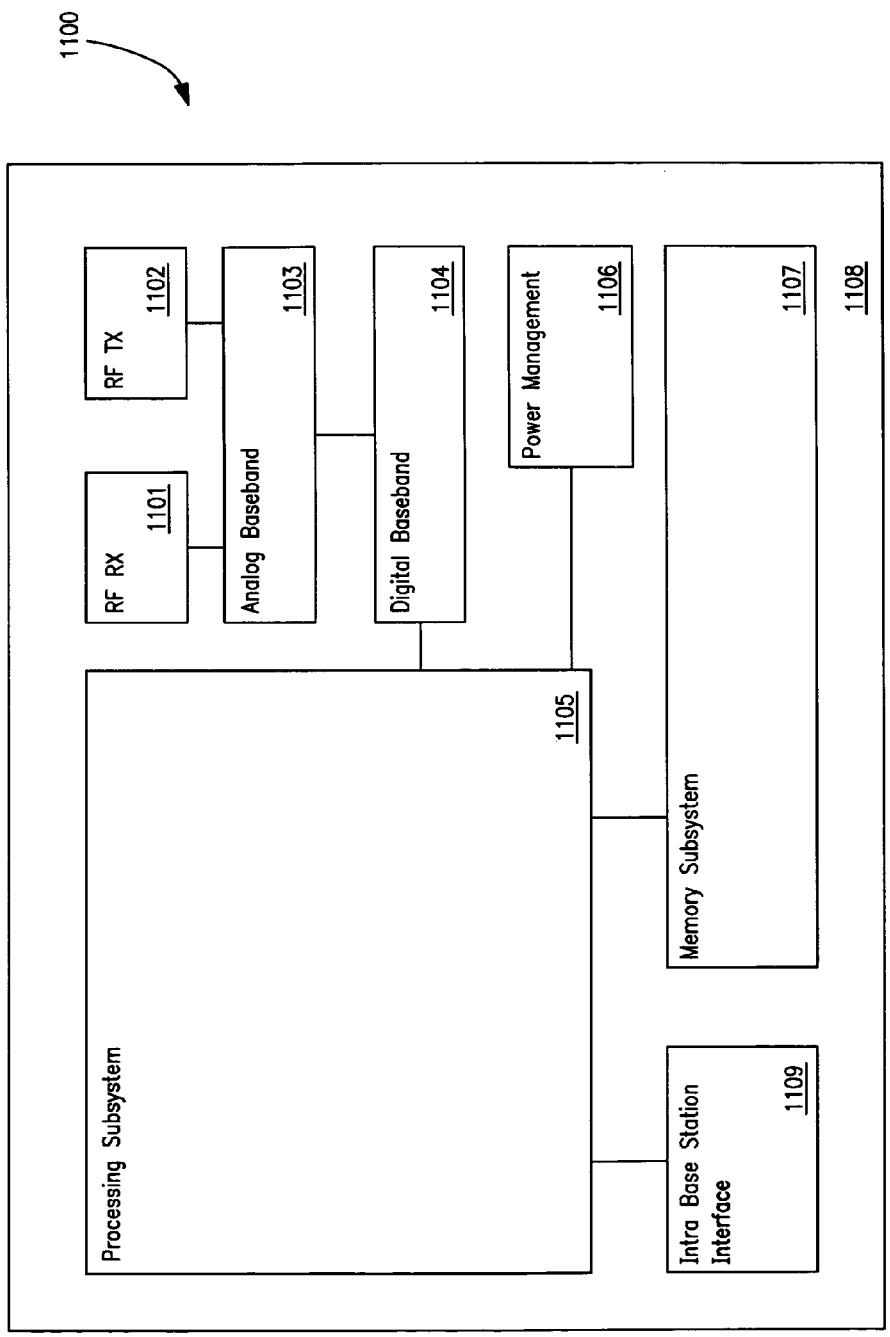
FIG. 11 is a block diagram of one embodiment of a base station apparatus configured in accordance with the present invention.

Referring now to FIG. 11, one embodiment of base station apparatus 1100 implementing the present invention is illustrated. The base station apparatus 1100 comprises one or more substrate(s) 1108 that further include a plurality of integrated circuits including a processing subsystem 1105 such as a digital signal processor (DSP), microprocessor, gate array, or plurality of processing components as well as a power management subsystem 1106 that provides power to the base station 1100. As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

The processing subsystem 1105 may comprise a plurality of processors (or multi-core processor(s)). As used herein, the term "processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Additionally, the processing subsystem also may comprise a cache to facilitate processing operations.

In the illustrated embodiment, the processing subsystem additionally comprises functional subsystems or modules for: (i) scheduling operation for a coordinated set of base stations, (ii) exchanging schedule information with other coordinated base stations, and (iii) distributing scheduling information to mobile devices. These subsystems may be implemented in software, firmware and/or hardware, and are logically and/or physically coupled to the processing subsystem. As used herein, the terms "software" and "computer program" are meant to include any sequence or human or machine cognizable steps which perform a function. Such program may be rendered in virtually any programming language or environment. Furthermore, it is appreciated that not all participants in a bundled acknowledgment operation require each subsystem or module. For example, a limited capabilities base station (for example, a femtocell, etc.) may not have a scheduling subsystem. The limited capability base station may only function as a supplemental base station of a coordinated set.

In one embodiment, the scheduling subsystem comprises a database or memory structure localized within the apparatus 1100 adapted to store one or more bundle schedules. In one variant, the scheduling subsystem additionally comprises a memory, and or processing device for running optimization engine software. Moreover, the optimization engine may include for example monitoring apparatus for network activity, or memory apparatus adapted to store knowledge of the network activity. It will be appreciated that the input scheduling parameters may change on a regular or irregular basis; thus, the optimization engine may be run continuously, or in response to corresponding changes or events, as desired.

In one embodiment, the base station communication subsystem may comprise one or more interfaces 1109 to a centralized base station, and or other supplemental base stations, adapted for receiving and transmitting messages pertaining to one or more scheduling parameters. As shown, the base station 1100 comprises an intra-base station interface 1109. The interface may be either wired or wireless, and generally comprises a secure interface to one or more other base stations. In one exemplary implementation, the intra-base station communication is based on an X2 type LTE eNB base station interface of the type well known in the cellular arts. In another implementation, the intra-base station interface is a re-purposed connection, or general purpose connection such as may be useful with femtocells, and/or access points (e.g., a broadband DSL, cable, T1, ISDN, microwave link, etc.).

The mobile device communication subsystem includes in one embodiment apparatus for transmitting and receiving messages from a mobile device. The apparatus 1100 shown in FIG. 11 comprises a modem circuit configured to provide bundled acknowledgment operation to a wireless mobile device, and transmit data packets, in accordance with a coordinated schedule. The modem subsystem comprises a digital baseband, analog baseband, and RF components for RX and TX. While multiple subsystems are illustrated, it is appreciated that all or portions of the modem subsystem may be consolidated consistent with the invention.

The processing subsystem 1105 is preferably connected to a memory subsystem 1107. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM. The memory subsystem of the embodiment illustrated in FIG. 11 comprises a direct memory access (DMA), operational random access memory (RAM), and non-volatile memory.

Exemplary Mobile Apparatus

Figure 12:
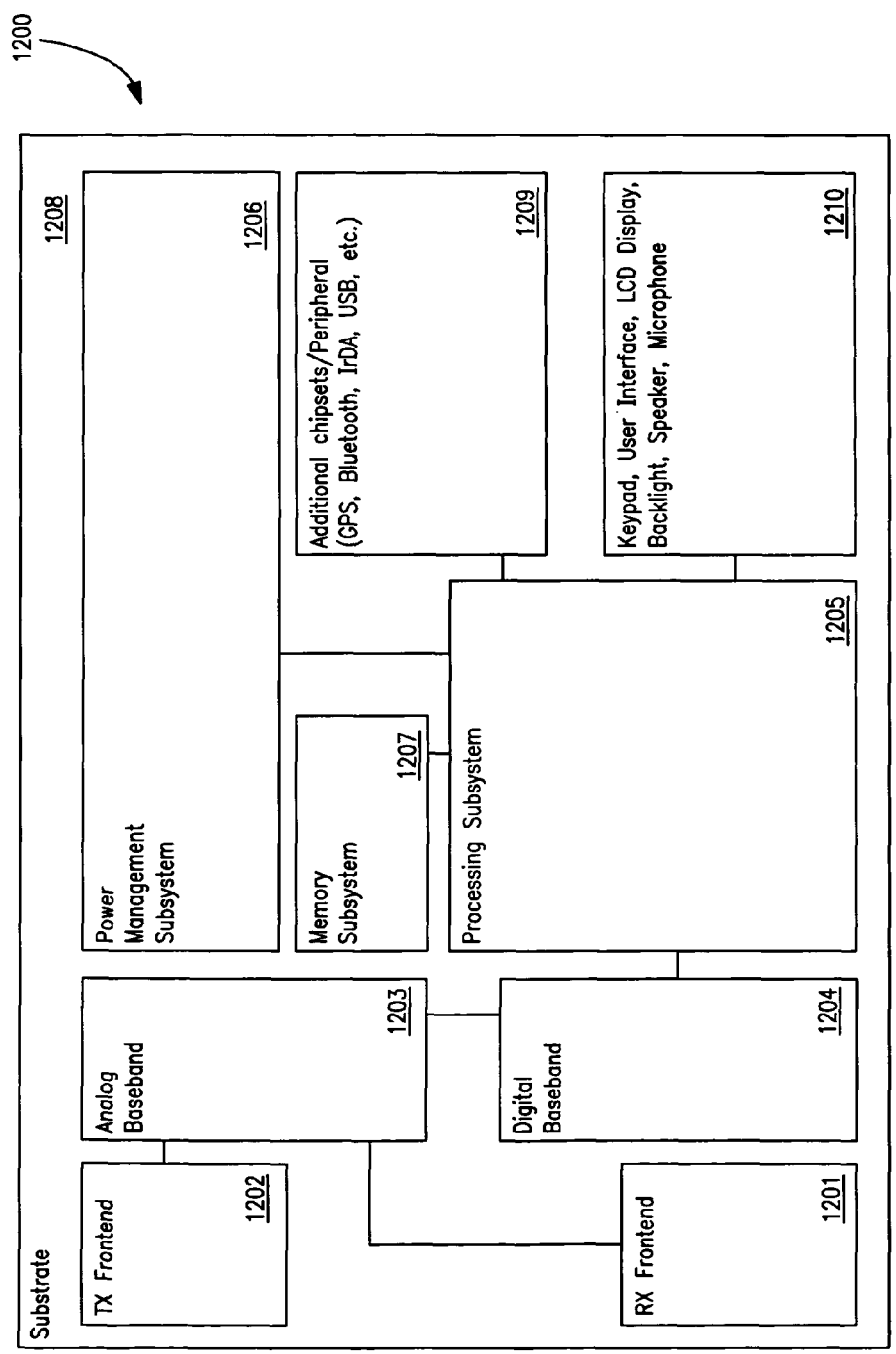
FIG. 12 is a block diagram of one embodiment of a mobile device apparatus configured in accordance with the present invention.

Referring now to FIG. 12, one embodiment of a client apparatus 1200 implementing the present invention is illustrated. The configuration of "bundled acknowledgment" operation as previously described herein is preferably performed in software, although firmware and or hardware embodiments are also envisioned.

The exemplary client apparatus 1200 of FIG. 12 comprises a mobile device having a processor subsystem 1205 such as a digital signal processor, microprocessor, field-programmable gate array, or plurality of processing components mounted on one or more substrates 1208. The processing subsystem may also comprise an internal cache memory. The processing subsystem 1205 is connected to a memory subsystem 1207 comprising memory which may for example, comprise SRAM, flash and SDRAM components. The memory subsystem may implement one or a more of DMA type hardware, so as to facilitate data accesses as is well known in the art.

In the illustrated embodiment, the processing subsystem additionally comprises subsystems or modules for: (i) receiving multiple data packets, (ii) performing one or more decoding operations, and (iii) returning an acknowledgement. These subsystems may be implemented in software or hardware which is coupled to the processing subsystem. Alternatively, in another variant, the subsystems may be directly coupled to the digital baseband. The illustrated embodiment logically or physically couples the data packet buffering subsystem, the soft combining subsystem, and the acknowledgement subsystem, although other architectures may be used consistent with the invention.

In one exemplary embodiment, the mobile device decodes a message from the serving base station, the message instructing the mobile device to set or change its bundled acknowledgement modes via a schedule message. Thus, the bundled acknowledgment mode subsystem or module may additionally include a memory for retrieving bundled acknowledgment mode configurations that are pre-stored. Alternatively (or additionally), the bundled acknowledgment mode reception subsystem may include an interface for receiving, and responding to bundled acknowledgment mode indications, which are directly messaged to the UE.

The bundled acknowledgment mode determination subsystem includes, in one possible configuration, one or more processing elements (e.g., a microprocessor, microcontroller, digital baseband, etc.) adapted to provide bundled acknowledgment criteria such as application requirements, processor capabilities, power consumption, supported modem options, etc. In yet other configurations, the bundled acknowledgement mode subsystem includes one or more apparatus (e.g., radio interface, etc.) suited for exchanging and negotiating one or more bundled acknowledgment parameters with the network.

The modem configuration subsystem may also include an internal schedule (e.g., a lookup table, memory structure, etc.) identifying times and frequency bands for discontinuous reception (DRX). In alternate embodiments, the modem configuration subsystem 1205 may comprise one or more internal programs adapted to request adjustment to bundled mode operation (e.g., requests for limiting bundled acknowledgment operation to a subset of physical resources, swapping out or adding resources, etc.).

The radio/modem subsystem includes a digital baseband 1204, analog baseband 1203, TX frontend 1202 and RX frontend 1201. The apparatus 1200 further comprises an antenna assembly with a selection device; the selection component may comprise for example a plurality of switches for enabling various antenna operational modes, such as for specific frequency ranges, or specified time slots.

While specific architecture is discussed, in some embodiments, some components may be obviated or may otherwise be merged with one another (such as RF RX, RF TX and ABB combined, as of the type used for 3G digital RFs) as would be appreciated by one of ordinary skill in the art given the present disclosure.

The illustrated power management subsystem (PMS) 1206 provides power to the UE, and may comprise an integrated circuit and or a plurality of discrete electrical components. In one exemplary portable UE apparatus, the power management subsystem 1206 advantageously interfaces with a battery.

The user interface system 1210 may include any number of well-known I/O including, without limitation: a keypad, touch screen, LCD display, backlight, speaker, and microphone. However, it is recognized that in certain applications, one or more of these components may be obviated. For example, PCMCIA card type UE embodiments may lack a user interface (as they could piggyback onto the user interface of the device to which they are physically and or electrically coupled).

The apparatus 1200 further comprises optional additional peripherals 1209 including, without limitation, one or more GPS transceivers, or network interfaces such as IrDA ports, Bluetooth transceivers, USB, Firewire, etc. It is however recognized that these components are not necessarily required for operation of the UE in accordance with the principles of the present invention.

Exemplary LTE Bundled HARQ Operation

Figure 13:
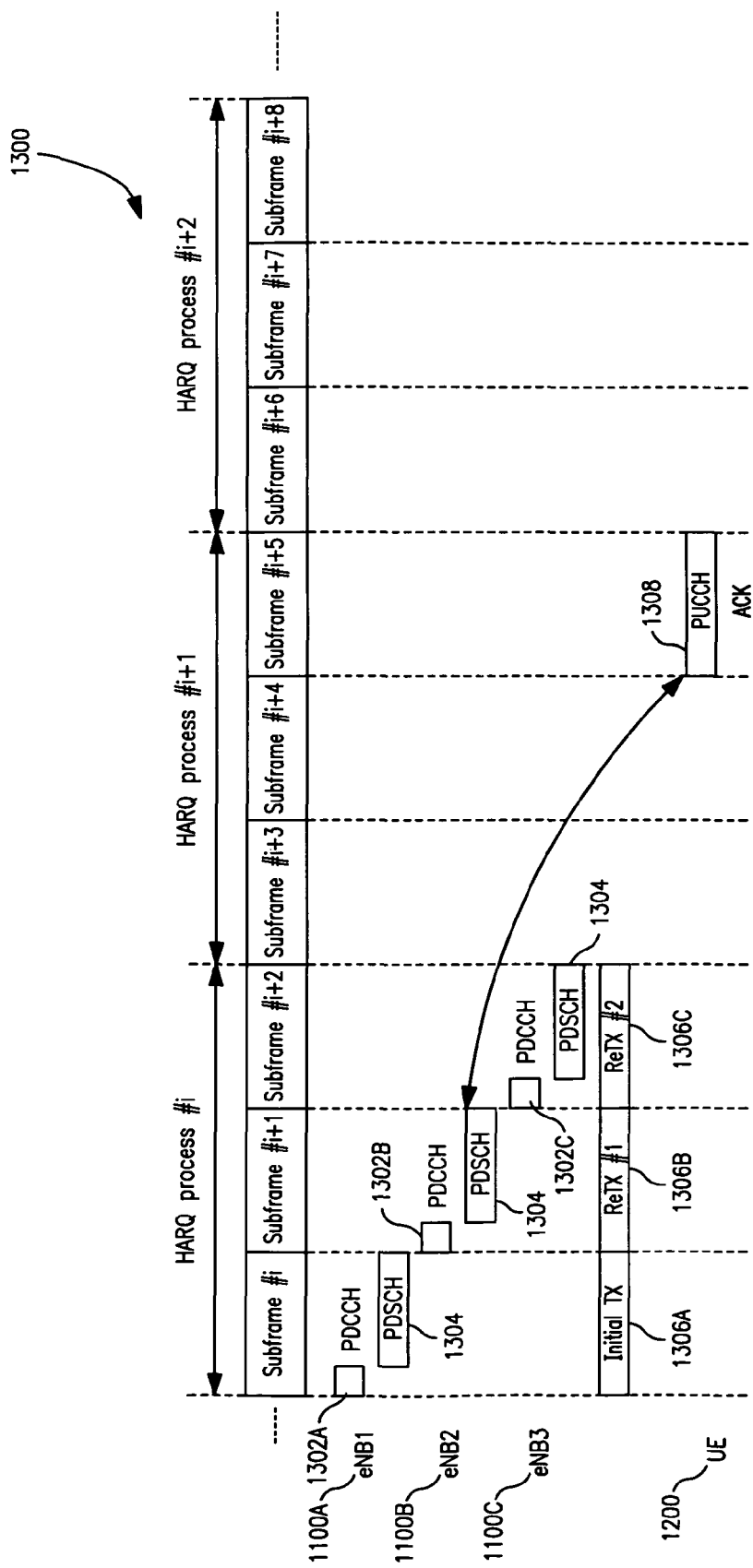
FIG. 13 is a graphical representation of the timing relationships of one embodiment of a downlink bundled acknowledgment scheme according to the present invention.

Several exemplary LTE Bundled HARQ implementations illustrating one or more aspects of the invention are now described. FIG. 13 represents a first exemplary LTE network comprising a plurality of base stations 1100 including a first "serving" eNB 1100A, and a second and third "supplemental" eNBs (1100B, 1100C). The term "serving" base station as used in the present context describes a base station which is in charge of the radio connection to the user equipment (UE). Correspondingly, the term "supplemental" base station as used in the present context describes a base station which is not controlling or "in charge" of the radio connection to the user equipment (UE). Accordingly, in the following discussion, the "coordinated set" comprises both the serving base station, and its companion supplemental base stations. In one exemplary embodiment, the coordinated set comprises a CoMP (Coordinated Multipoint Transmission/Reception) coordinated set, although other configurations may be used with equal success.

The following discussion describes in greater detail various embodiments of the present invention, useful for reducing interference between the coordinated set, while also minimizing HARQ transmission delay. The bundling of HARQ processes between the coordinated cells in the downlink direction is referred to hereinafter as "HARQ bundling".

In one such embodiment, the serving eNB 1100A within a CoMP coordinated set selectively applies HARQ bundling as described herein for transmission of control and user data, based at least in part on one or more measurements provided by the UE 1200 (e.g., CQI measurements for the CoMP coordinated set), and/or the known traffic (i.e., existing services) of the CoMP cells. Such measurements may also include for example: (i) a number of erroneous received data blocks, (ii) the downlink interference (e.g., BER), and/or (iii) HARQ transmission delays above a minimum threshold.

The HARQ bundling operation may also be enabled or disabled by the serving eNodeB 1100A through its Physical Downlink Control Channel 1302A (PDCCH). In one exemplary variant, the HARQ bundling operation is enabled and or disabled by predefined messages sent on the PDCCH (e.g. "00000000", "11111111", etc.). In another variant, the HARQ bundling operation is enabled or disabled with a configurable parameter. For example, responsive to receiving the HARQ bundling message (enable) in subframe #i, the UE begins HARQ bundling operation in subframe #i+N, where N is a configurable parameter set by the serving eNB. Similarly, if HARQ bundling is disabled by a predefined message on the PDCCH in subframe #i, the UE disables HARQ bundling in subframe #i+M, in which M is a configurable parameter set by the serving eNB. In an alternate variant, the HARQ bundling operation is enabled or disabled with one or more fixed parameters.

In another embodiment of the invention, a set of L consecutive downlink subframes is bundled, where the number L is selected by the serving eNB 1100A. In one such variant, HARQ bundling applies to all downlink transmissions using the Physical Downlink Shared Channel 1304 (PDSCH). In alternate variants, HARQ bundling applies only to a subset of the downlink transmissions using the PDSCH. The set of L consecutive downlink subframes can be assigned symmetrically to ones of the coordinated set, or alternatively asymmetrically to ones of the coordinated set (e.g., to accentuate the contributions from one or more members). For example, a BS which has particularly good reception may transmit half of the downlink subframes, whereas a marginal BS may only transmit a quarter of the downlink subframes. In another example, a BS which is particularly lightly loaded may transmit many more subframes, thereby reducing the support burden on other heavily loaded BSs.

In one implementation, a serving cell 1100A transmits a first data block 1306A, and supplemental cells transmit supplemental versions (1306B, 1306C) of the first data block having different redundancy versions. The supplemental cells sequence of re-transmissions and redundancy versions are determined by the serving eNB. Alternatively, the supplemental cell's sequence of re-transmissions and redundancy versions are determined by a radio access network entity. The serving base station coordinates the action of the coordinated set, using a dedicated signaling interface to the supplemental base stations.

One or more members of the coordinated set may transmit the data blocks with a reduction in transmit power, where the reduction in transmit power is augmented with supplemental data block transmissions from other one or more members of the coordinated set. In one variant, the one or more members of the coordinated set identifies a number of supplemental cells. Each base station of the coordinated set can decrease its transmission power. The amount of decreased transmission power may be based on: the number of other base stations included in the coordinated set, the base station's expected received signal strength at the UE, the base station's expected interference with other UEs, etc. In some implementations, the calculation of appropriate reduction in transmit power for each base station of the coordinated set is performed at the serving base station.

The serving base station 1100A coordinates the actions of the user equipment 1200 (UE) using for example the PDCCH 1302A. The serving eNB signals one or more of the following parameters to the UE: (i) size of HARQ bundling (e.g., number of L consecutive downlink subframes that will be bundled), (ii) the identity of the supplemental cells which are involved in HARQ bundling operation, and/or (iii) the transmission sequence of the supplemental cells which are involved in HARQ bundling operation.

The following specific parameters are signaled in each of the supplemental cells to the UE through PDCCH (1302B, 1302C): (i) the re-transmitted information data block, and (ii) the redundancy version of the re-transmitted data.

In one variant, the following specific parameters are signaled from the serving eNB 1100A to one or more of the supplemental eNodeBs (1100B, 1100C) through the X2 interface: (i) the size of HARQ bundling (e.g., number of L consecutive downlink subframes that will be bundled), (ii) the identity of the supplemental cells participating in HARQ bundling operation, (iii) the transmission sequence of the supplemental cells participating in HARQ bundling operation, (iv) the initial radio frame and subframe number for enabling/disabling HARQ bundling operation, (v) the data block to be transmitted/re-transmitted, (vi) redundancy versions to be used for the re-transmitted data, (vii) transmit power levels to be used for the re-transmitted data, and/or (viii) the HARQ process number.

Responsive to receiving a plurality of transmissions and re-transmissions, the UE 1200 soft-combines and jointly decodes the received data. In one variant, the bundled HARQ ACK 1308 is sent in response to the subframe in which the received data was successfully decoded. In another variant, the bundled HARQ ACK is sent in a scheduled subframe, regardless of successful decoding of data. Alternatively, a HARQ NACK may be sent only in response to the last subframe of the bundle, and when soft-combining and joint decoding of all bundled subframes was not successful.

It is noted that the same HARQ process number may be used in each of the bundled subframes if desired. Moreover, the re-transmission of a HARQ bundle may also be a HARQ bundle. In other implementations, the re-transmission of a HARQ bundle is not a bundle (i.e., is only transmitted from a single base station).

The following example scenario is presented to further illustrate LTE HARQ bundling operations according to various embodiments of the invention.

The LTE-Advanced network uses OFDMA/TDMA in the downlink direction, and SC-FDMA/TDMA in the uplink direction. The RAN is operating in Frequency Division Duplex (FDD) mode. Moreover, the coordinated set is operating CoMP in the downlink. As previously mentioned, the CoMP coordinated set comprises three (3) collaborative (serving and supplemental) eNBs 1100. A UE 1200 is in the coverage of 3 cells (cell 1 to cell 3), each cell served by its associated eNodeB (eNB 1 1100A, eNB2 1100B, eNB3 1100C). In order to control inter-cell interference the coordinated cells operate according to a coordinated schedule; i.e., at a time instant UE receives data from only one of the transmitting cells/eNodeBs.

The coordinated set is servicing a first UE 1200. Within the set of 3 coordinated cells, cell 1 1100A is the current serving cell, whereas cell 2 1100B and cell 3 1100C are supplemental cells. At initial radio connection establishment, the serving eNB1 signals to the UE parameters related to bundled HARQ operation. The serving eNB1 sets M=N=4; thus, if the UE receives a HARQ bundling HARQ activation order at subframe #i, the UE will enable HARQ bundling operation in subframe #i+4 (i.e., M=4).

Further, if the UE receives a HARQ bundling HARQ deactivation order at subframe #i, the UE will disable HARQ bundling in subframe #i+4 (N=4).

Similarly, the eNB1 identifies PDCCH messages for enabling and disabling HARQ bundling. HARQ bundling operations can be enabled by the predefined message "00000000", or disabled by the predefined message "11111111" sent on the PDCCH, although it will be readily appreciated that these parameters may be varied, and similarly may be broadcast/multicast (versus point-to-point transmission), or pre-defined within a standard, etc.

Once the first eNB has communicated the necessary parameters to the second and third eNB, and the first UE, operation proceeds normally. Responsive to receiving the parameters, each of the involved entities initializes its appropriate apparatus. The serving base station monitors the Radio Access Network (RAN).

During high traffic loads in the CoMP cells, the downlink interference increases significantly. The serving eNB1 receives corresponding CQI measurements provided by UE, and monitors increases in HARQ transmission delay (i.e., due to increased number of re-transmissions). At a trigger threshold or other event of interest, the serving eNB1 decides to apply HARQ bundling. Based on UE measurements (e.g., nearby cell IDs, CQI, etc.), the serving eNB1 identifies a bundle size, the appropriate members of the coordinated set, and a transmission order.

In this example, the UE 1200 may have strong signals from eNB2 1100B, and eNB3 1100C, other nearby cells may be active, but too weak for operation. Moreover, eNB2 1100B has a higher quality signal than eNB3 1100C. Thus, the serving eNB1 1100A identifies: (i) the bundle size L=3 (i.e., corresponding to eNB1, eNB2, eNB3), (ii) the appropriate members of the set (eNB1, eNB2, eNB3), and (iii) the transmission order (in order of highest CQI to lowest CQI). Moreover, the serving eNB1 determines the time instant at which HARQ bundling mode operation shall be started (radio frame/subframe number). Additionally, the serving eNB 1 identifies appropriate transmit power levels and redundancy versions to be used by the supplemental cells. These parameters (and the information block to be transmitted and or re-transmitted) are signaled to the supplemental eNBs (eNB2, eNB3) through the X2 interface.

Referring back to FIG. 13, the serving eNB1 1100A transmits in subframe #i−4 the PDCCH 1302A message to enable HARQ bundling operation in subframe #i, The following parameters are signaled to the UE at subframe #i in the PDCCH 1302A: (i) bundle size (L=3), (ii) the appropriate members of the set (eNB1 1100A, eNB2 1100B, eNB3 1100C), and (iii) the transmission order (eNB1, eNB2, eNB3). Following the PDCCH 1302A, in the PDSCH 1304 of subframe #i, the serving eNB1 transmits the first initial data block 1306A (first redundancy version) at reduced power.

At subframe #i+1, the second supplemental eNB2 1100B transmits its PDCCH 1302B, PDSCH 1304 to the UE 1200. The PDCCH 1302B indicates the second redundancy version of the re-transmitted data block #1 130613. The PDSCH 1304 is transmitted at reduced power, the transmission containing the second redundancy version of the re-transmitted information data block #1 1306B.

Similarly, at subframe #i+2, the third supplemental eNB3 1100C transmits its PDCCH 1302C, PDSCH 1304 to the UE 1200. The PDCCH 1302C indicates the third redundancy version of the re-transmitted data block #1 1306C. The PDSCH 1304 is transmitted at reduced power, and contains the third redundancy version of the re-transmitted information data block #1 1306C. The first 1306A, second 1306B and third 1306C data packets are uniquely identified at the UE by their shared HARQ process ID.

For purposes of this example, assume that the data sent on the aggregate PDSCH could be successfully decoded in the receiver at UE after subframe #i+1; i.e., after soft-combining and joint decoding of the received data in subframe #i and #i+1. The UE sends a HARQ ACK in subframe #i+5 on PUCCH 1308 (a HARQ ACK in response to the successfully decoded data in subframe #i+1). The data of the third supplemental eNB3 is discarded.

Alternatively, assume that the data sent on the aggregate PDSCH could not be successfully decoded in the receiver at the UE even after subframe #i+2; i.e., after soft-combining and joint decoding of the received data in subframe #i, #i+1, and #i+2. The UE sends a HARQ NACK in subframe #i+6 on PUCCH. The serving base station notifies each of the coordinated set, and the next re-transmission occurs in subframe #i+9, #i+10, #i+11.

In the foregoing scenario the transmit power of the first, second and third base stations may be reduced. Accordingly, the base station induced interference is substantially reduced both among the coordinated set, as well as among the nearby base stations not included in the coordinated set. Such reduced transmit power has substantial positive impact on the spectral resources of the radio access network.

Furthermore, the UE has received and soft-combined three (3) distinct data packets, each with a different redundancy, by subframe #i+2. In contrast, normal HARQ operation would provide: (i) an initial transmission at subframe #i, (ii) a first acknowledgment at subframe #i+4, (iii) a first re-transmission at subframe #i+8, (iv) a second acknowledgment at subframe #i+12, (v) a second re-transmission at subframe #i+16, and (vi) a final acknowledgment at subframe #i+16. It should be noted that even a first re-transmission of the prior art HARQ operation is longer than the exemplary HARQ bundling process of the present invention. Accordingly, the bundling process provides superior economy in both the temporal and resource domains.

Moreover, the UE only retains and processes a single HARQ process for the coordinated set of base stations. Recall that in prior art CoMP implementations, HARQ processes are distinct and independent among each of the base stations. In contrast, the UE enabled with the present invention greatly reduces its processing and transceiver burden by inter alia use of the foregoing single HARQ process.

Business Methods and Rules Engine

It will be recognized that the foregoing network apparatus and methodologies may be readily adapted to various business models. Various aspects of the present invention substantially improve both quality and efficiency of service, and service coverage. Thus, in one such business model, a service provider or network operator may provide an enhanced-coverage service afforded by such "communal" base station operation (such as that described previously herein) to customers willing to pay a premium, or as an incentive for its higher-tier customers.

In another paradigm, certain strategic users could be selected to receive such enhanced-coverage service (or base station; e.g., femtocell) based on, inter alia, their subscription level, rate of usage, geographic location, etc.

The aforementioned network apparatus and methodologies may also be readily adapted for operation in accordance with an underlying business rules "engine". This business rules engine may comprise for example a software application and/or hardware, and is implemented in one embodiment as a separate entity at the Core Network, or alternatively within an existing entity residing at the Core Network or other network management process (including the EPC(s)). The engine may also be integrated or coordinated with the optimization engine previously described herein if desired. Hence, the business rules engine may be centralized, localized, or distributed (i.e., among multiple different platforms) in nature, depending on the desired operational attributes.

In one embodiment, the business rules engine takes into account the revenue and or profit implications associated with providing resources to one or more subscribers so that the resource allocation to its serving coordinated set of base stations does not negatively impact network user experience (e.g., slowing downloads, latency in call or session setup, negatively impacting QoS-based services, etc.), or the services that are able to be provided to users on the network via the geographically fixed base stations. Accordingly, the exemplary business rules engine of the present invention can modify the behavior of the system at specific steps described in the methodologies above in order to accomplish one or more economic or operational objectives for the network operator.

For instance, evaluation of the request from a subscriber for bundled acknowledgement may include an analysis of the incremental cost, revenue, and or profit associated with the various allocation options (allocation of resources to the requesting subscriber, or denial of the request and allocation of the resources to another subscriber or subscribers). These "business rules" may be imposed for example at time of resource request, and then maintained for a period of time (or until an event triggering a re-evaluation occurs), or alternatively according to a periodic or even randomized or statistical model.

As yet another alternative, the base station may be equipped with logic (e.g., a business rules engine or component thereof, such as a client portion of a distributed software application) that is configured to analyze and make business or operational decisions relating to the business model between the client device (e.g., UE) and the base station. For instance, the base station may preferentially process or allocate resources to certain requesting users based on their status (e.g., as existing subscribers of the service provider associated with the Core Network, the type of service requested and revenue/profit implications associated therewith, etc.)

Myriad different schemes for implementing dynamic allocation of resources will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method of optimizing inter-cell operation within a multi-cell wireless network, comprising:
    transmitting a first one or more data packets from a first cell; and
    selectively scheduling at least one other cell for transmission of subsequent error correction data packets associated with but distinct from the first one or more data packets, the subsequent error correction data packets comprising redundant information useful for correction of the first one or more data packets;
    wherein the first one or more data packets and the subsequent error correction data packets are configured to enable soft combination and reduced transmission power;
    wherein the method further comprises:
    responsive to receiving the first one or more data packets and the subsequent error correction data packets at a first receiver:
        decoding the first one or more data packets and subsequent error correction data packets in combination; and transmitting a message to the first cell, where the message indicates success or failure of the decoding;
when the message indicates success of the decoding:
transmitting a second one or more data packets from the first cell;
selectively scheduling at least one other cell for the transmission of subsequent error correction data packets, the subsequent error correction data packets comprising redundant information useful for correction of the second one or more data packets; and
when the message indicates failure of the decoding:
transmitting a second set of error correction data packets from the first cell and at least one other cell, wherein the second set of error correction data packets comprise redundant information useful for correction of the first one or more data packets.

2. The method of claim 1, wherein the method further comprises determining the reduction in transmission power of the first cell of the multi-cell wireless network based at least in part on the subsequent error correction data packets of the at least one other cell.

3. Receiver apparatus, comprising:
a digital processor;
a wireless interface in data communication with the digital processor; and
a storage apparatus having a storage medium with at least one computer program stored thereon, the at least one computer program comprising a plurality of computer executable instructions that when executed by the digital processor:
receive a transmission schedule from a first transmitter over the wireless interface;
receive a first data packet from a first transmitter over the wireless interface;
receive a second error correction data packet from at least one second transmitter over the wireless interface;
where the first transmitter and the second transmitter comprise a first and second distinct cells, respectively;
decode the received first data packet in conjunction with the second error correction data packet; and
transmit an acknowledgement message, wherein the acknowledgment message indicates either a successful decoding or an unsuccessful decoding;
when the acknowledgment message indicates success of the decoding:
receiving a second one or more data packets from the first transmitter;
selectively scheduling at least one other transmitter for the transmission of subsequent error correction data packets, the subsequent error correction data packets comprising redundant information useful for correction of the second one or more data packets; and
when the acknowledgment message indicates failure of the decoding:
receiving a second set of error correction data packets from the first transmitter and at least one other transmitter, wherein the second set of error correction data packets comprise redundant information useful for correction of the first data packet.

4. The apparatus of claim 3, wherein the acknowledgment message is directed to the first transmitter.

5. The apparatus of claim 3, wherein the acknowledgment message is directed to the second transmitter.

6. The apparatus of claim 3, wherein the first data packet is identified with a first identifier.

7. The apparatus of claim 6, wherein the second error correction data packet is also identified with the first identifier.

8. The apparatus of claim 7, further comprising instructions that when executed by the digital processor, soft combine the first data packet and second error correction data packet.

9. A method of optimizing inter-cell operation within a multi-cell wireless network, comprising:
transmitting a first one or more data packets from a first cell; and
selectively scheduling at least one other cell for transmission of subsequent error correction data packets, the subsequent error correction data packets comprising redundant information useful for correction of the first one or more data packets;
responsive to receiving the first one or more data packets and the subsequent error correction data packets at a first receiver:
decoding the first one or more data packets and subsequent error correction data packets in combination; and
transmitting a message to the first cell, where the message indicates success or failure of the decoding; and
when the message indicates success of the decoding:
transmitting a second one or more data packets from the first cell;
selectively scheduling at least one other cell for the transmission of second subsequent error correction data packets, the second subsequent error correction data packets comprising redundant information useful for correction of the second one or more data packets; and
when the message indicates failure of the decoding:
transmitting a third set of error correction data packets from the first cell and at least one other cell, wherein the third set of error correction data packets comprise redundant information useful for correction of the first one or more data packets; and
wherein the transmitting and selectively scheduling cooperate to substantially reduce a transmission power required for the first cell of the multi-cell wireless network.

10. The method of claim 9, wherein the method further comprises determining the reduction in transmission power of the first cell of the multi-cell wireless network based at least in part on the subsequent error correction data packets of the at least one other cell.

11. The method of claim 9, wherein the first one or more data packets are identified with a first identifier.

12. The method of claim 11, wherein the subsequent error correction data packets are also identified with the first identifier.

* * * * *